(12) United States Patent
Onda et al.

(10) Patent No.: US 10,379,832 B2
(45) Date of Patent: Aug. 13, 2019

(54) SOFTWARE INTRODUCTION SUPPORT DEVICE AND SOFTWARE INTRODUCTION SUPPORT METHOD

(71) Applicant: FUJITSU LIMITED, Kawasaki-shi, Kanagawa (JP)

(72) Inventors: Tomoyuki Onda, Sagamihara (JP); Takahisa Hatakeyama, Kawasaki (JP); Miho Kato, Kawasaki (JP); Kazumi Sasae, Takarazuka (JP); Ayano Koike, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 22 days.

(21) Appl. No.: 15/454,506

(22) Filed: Mar. 9, 2017

(65) Prior Publication Data
US 2017/0262269 A1 Sep. 14, 2017

(30) Foreign Application Priority Data

Mar. 11, 2016 (JP) .................................. 2016-048280

(51) Int. Cl.
*G06F 8/61* (2018.01)
*G06F 11/36* (2006.01)

(52) U.S. Cl.
CPC ............ *G06F 8/61* (2013.01); *G06F 11/3612* (2013.01); *G06F 11/3664* (2013.01)

(58) Field of Classification Search
CPC ........................................................ G06F 8/61
USPC ......................................................... 717/174
See application file for complete search history.

(56) References Cited

U.S. PATENT DOCUMENTS 6,202,121 B1 * 3/2001 Walsh .................. G06F 3/0607
711/100
6,678,888 B1 1/2004 Sakanishi
7,174,540 B2 * 2/2007 Ondrusek ................. G06F 8/71
717/120

(Continued)

FOREIGN PATENT DOCUMENTS

JP 2000089809 A * 3/2000
JP 2001-067225 3/2001
JP 2014-191641 10/2014

*Primary Examiner* — James D. Rutten
(74) *Attorney, Agent, or Firm* — Fujitsu Patent Center

(57) ABSTRACT

A device includes a processor that performs a procedure. The procedure includes: referencing a storage section storing one or more item of introduction actual-result information associating introduction sequence information regarding respective software items with success or failure of introduction, and determining any correlations with introduction sequence information regarding respective software items included in a new software group; and, reflecting in an estimation result any determination that the introduction sequence of the respective software included in the new introduction software group partially matches the introduction sequence information, as a positive element for the success or failure associated with the partially matched introduction sequence information, and reflecting in the estimation result any determination that a differently sequenced combination of the introduction software group matches the introduction sequence information, as a negative element for the success or failure associated with the introduction sequence information that matched the differently sequenced combination.

13 Claims, 25 Drawing Sheets

(56) References Cited

U.S. PATENT DOCUMENTS

| | | | |
|---|---|---|---|
| 8,285,846 B2 * | 10/2012 | Pyhalammi | G06F 9/44536 709/202 |
| 8,291,402 B2 * | 10/2012 | Pazdziora | G06F 8/65 717/168 |
| 8,752,038 B1 * | 6/2014 | Newstadt | G06F 9/4401 713/2 |
| 9,256,509 B1 * | 2/2016 | Rajagopal | G06F 11/3604 |
| 9,946,879 B1 * | 4/2018 | Sharifi Mehr | G06F 21/577 |
| 2004/0015946 A1 * | 1/2004 | Te'eni | G06F 8/61 717/169 |
| 2006/0136914 A1 * | 6/2006 | Marascio | G06F 11/3664 718/100 |
| 2007/0294681 A1 * | 12/2007 | Tuck | G06F 11/3404 717/149 |
| 2011/0314340 A1 * | 12/2011 | Gilkerson | G06F 9/3808 714/37 |
| 2014/0173581 A1 * | 6/2014 | Grinberg | G06F 8/654 717/170 |
| 2014/0245279 A1 * | 8/2014 | Ohtake | G06F 9/445 717/170 |
| 2014/0298321 A1 | 10/2014 | Morino et al. | |
| 2016/0132421 A1 * | 5/2016 | Cobb, Jr. | G06F 11/3688 717/131 |
| 2017/0034023 A1 * | 2/2017 | Nickolov | H04L 43/0817 |
| 2017/0153965 A1 * | 6/2017 | Nitta | G06F 17/30601 |

\* cited by examiner

FIG.2

Table 60:

| SOFTWARE | LAYER | PRIORITY |
|---|---|---|
| A | PLATFORM | 1 |
| B | BUSINESS | 2 |
| C | OPERATING MONITORING | 3 |
| ... | ... | ... |

Table 61:

| SOFTWARE | PROVISION DATE |
|---|---|
| A | 2010/10/10 |
| B | 2011/25/25 |
| C | 2012/12/12 |
| ... | ... |

FIG.3

| BAD COMBINATION | BAD COMBINATION 2 | BAD COMBINATION 3 | ... |
|---|---|---|---|
| 1 | B | A | |
| A | P | P | |
| O | | Q | |
| | | | |

62

| ASSESSED PATTERN | ASSESSMENT-RESULT INFORMATION | INSTALLATION SEQUENCE | | | | |
|---|---|---|---|---|---|---|
| | | 1 | 2 | 3 | 4 | ... |
| ASSESSED PATTERN 1 | OK PATTERN | A | C | B | D | |
| ASSESSED PATTERN 2 | BAD PATTERN | C | A | D | D | |
| ASSESSED PATTERN 3 | OK PATTERN | A | D | B | B | |
| ASSESSED PATTERN 4 | BAD PATTERN | C | B | B | | |
| ASSESSED PATTERN 5 | OK PATTERN | C | E | F | | |
| ... | | ... | | | | ... |

| ID | SOFTWARE |
|----|----------|
| 1  | A        |
| 2  | B        |
| 3  | C        |
| ... |         |

64

| ID | TEST TOOL |
|----|-----------|
| 1  | X         |
| 2  | Y         |
| 3  | Z         |
| ... |          |

| ASSESSED PATTERN | ASSESSMENT-RESULT INFORMATION | INSTALLATION SEQUENCE ||||  |
|---|---|---|---|---|---|---|
| | | 1 | 2 | 3 | 4 | ... |
| ASSESSED PATTERN 1 | OK PATTERN | A | B | C | D | ... |
| ASSESSED PATTERN 2 | OK PATTERN | A | B | D | | ... |
| ... | ... | ... | ... | ... | ... | ... |

| ASSESSED PATTERN | ASSESSMENT-RESULT INFORMATION | INSTALLATION SEQUENCE | | | |
|---|---|---|---|---|---|
| | | 1 | 2 | 3 | 4 |
| ASSESSED PATTERN 1 | OK PATTERN | A | B | C | |
| ASSESSED PATTERN 2 | OK PATTERN | C | D | | |
| ... | ... | ... | ... | ... | ... |

63

| SOFTWARE PAIRS | PARTIAL-MATCH-PAIR CONTENT RATIO |
|---|---|
| [A, B] [A, C] [B, C] | 1/2 |
| [C, D] | 1/6 |

FIG.12

| ASSESSED PATTERN | MAXIMUM PARTIAL-MATCH-PAIR CONTENT RATIO | ACTUAL SUCCESS RATIO |
|---|---|---|
| ASSESSED PATTERN 1 ONLY | 1/2 | 1/2 |
| CASE OF ASSESSED PATTERN 1 AND ASSESSED PATTERN 2 | 1/2 | 1/2 OR GREATER |

FIG.13

| ASSESSED PATTERN | ASSESSMENT-RESULT INFORMATION | INSTALLATION SEQUENCE | | | | |
|---|---|---|---|---|---|---|
| | | 1 | 2 | 3 | 4 | ... |
| ASSESSED PATTERN 1 | OK PATTERN | C | B | | | |
| ASSESSED PATTERN 2 | OK PATTERN | A | C | E | | |

| a) ALL PAIR COMBINATIONS OF MAXIMUM SIDE SOFTWARE (B, C, A) | b) ALL PAIR COMBINATIONS OF MINIMUM SIDE SOFTWARE (C, B) | CONTRADICTION BETWEEN PAIRS OF a) AND PAIRS OF b) |
|---|---|---|
| B, C | C, B | YES |
| B, A | | |
| C, A | | |

FIG.15

| a) ALL PAIR COMBINATIONS OF MAXIMUM SIDE SOFTWARE (B, C, A) | b) ALL PAIR COMBINATIONS OF MINIMUM SIDE SOFTWARE (A, C, E) | CONTRADICTION BETWEEN PAIRS OF a) AND PAIRS OF b) |
|---|---|---|
| B, C | | |
| B, A | | |
| C, A | A, C | YES |
| | A, E | |
| | C, E | |

FIG.16

| CALCULATION TARGET | OK PATTERN | | NEW SOFTWARE GROUP (A, B, C) | | | DETERMINATION RESULT | VALUE OF EACH ELEMENT | | CALCULATION EQUATION | INSTALLATION SUCCESS RATIO |
|---|---|---|---|---|---|---|---|---|---|---|
| | INSTALLATION SEQUENCE | SOFTWARE PAIRS | TARGET PATTERN | INSTALLATION SEQUENCE | SOFTWARE PAIRS | | | | | |
| (a) | A → B → C → D | (A, B) (A, C) (A, D) (B, C) (B, D) (C, D) | 1 | A → B → C | (A, B) (A, C) (B, C) | PARTIAL MATCH | $\alpha$ | 3/6 | $3/6 \times 1 \times 1 \times 1$ | 50% |
| | | | | | | | $\beta_i$ | 0 | | |
| | | | | | | | $\gamma$ | 0 | | |
| | | | | | | | $\delta_j$ | 1 | | |
| (b) | | | 2 | C → B → A | (C, B) (C, A) (B, A) | CONTRADICTION | $\alpha$ | 3/6 | $3/6 \times (1-1/2) \times 1 \times 1$ | 25% |
| | | | | | | | $\beta_i$ | 1/2 | | |
| | | | | | | | $\gamma$ | 0 | | |
| | | | | | | | $\delta_j$ | 1 | | |

SOFTWARE INTRODUCTION SUPPORT DEVICE AND SOFTWARE INTRODUCTION SUPPORT METHOD

CROSS-REFERENCE TO RELATED APPLICATION

This application is based upon and claims the benefit of priority of the prior Japanese Patent Application No. 2016-48280, filed on Mar. 11, 2016, the entire contents of which are incorporated herein by reference.

FIELD

The embodiments discussed herein are related to a software introduction support program, a software introduction support device, and a software introduction support method.

BACKGROUND

Conventionally, when installing plural software items to a system, the plural software items are installed in a sequence assessed as operable, since the installation sequence has an influence on the operation of each software item.

For example, installation information related to an installation task of respective software items is extracted for plural software items to be installed to a device, and installation loads arising from installation task sequences of the respective software items are computed based on the extracted installation information. A method has been proposed for selecting a sequence for installing the plural software items based on the computed installation load. In the method, partial software installation sequences are extracted based on software having prerequisite relationships obtained from dependency relationships, and executable installation sequence candidates are extracted based on the extracted partial installation sequences.

Moreover, a method has been proposed for associating first software with second software needed in order to use the first software, and for managing the associations, and for associating information related to third software already installed to a management-target system with the management-target system and managing the associations. In the method, an instruction to distribute the first software is received, and, in cases in which the second software needed in order to use the first software is not in the third software, the second software is set as a distribution target. Then, the second software that was the distribution target is set as the first software, any needed second software is found, and the second software is set as the distribution target in cases in which the second software is not in the third software.

RELATED PATENT DOCUMENTS

Japanese Laid-Open Patent Publication No. 2014-191641
Japanese Laid-Open Patent Publication No. 2001-67225

SUMMARY

According to an aspect of the embodiments, a non-transitory recording medium stores a program that is executable by a computer to perform a software introduction support process. The process includes: referencing a storage section storing one or more item of introduction actual-result information associating introduction sequence information regarding respective software items included in a software group with success or failure of introduction, and determining any correlations between introduction sequence information regarding respective software items included in a new software group and the introduction sequence information stored in the storage section; and, in a case in which estimating whether or not introduction of the new introduction software group succeeds based on the result of the determination, reflecting in an estimation result any determination that the introduction sequence of the respective software included in the new introduction software group partially matches the stored introduction sequence information, as a positive element for the success or failure associated with the partially matched introduction sequence information, and reflecting in the estimation result any determination that a differently sequenced combination of the introduction software group matches the introduction sequence information, as a negative element for the success or failure associated with the introduction sequence information that matched the differently sequenced combination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of information stored in a software information storage section.

FIG. 3 is a diagram illustrating an example of information stored in an assessment result storage section.

FIG. 4 is a diagram illustrating an example of information stored in a library storage section.

FIG. 8 is a diagram illustrating an example of information stored in an assessment result storage section.

FIG. 11 is an explanatory diagram for explaining a case in which only an OK pattern maximum partial-match-pair content ratio is employed as an OK pattern match ratio.

FIG. 12 is a diagram for explaining a relationship between maximum partial-match-pair content ratios computed according to assessed patterns and actual success ratios.

FIG. 13 is a diagram illustrating an example of information stored in an assessment result storage section.

FIG. 14 is a diagram for explaining an OK pattern contradiction ratio.

FIG. 15 is a diagram for explaining an OK pattern contradiction ratio.

FIG. 16 is a diagram for explaining a computation example of an installation success ratio.

DESCRIPTION OF EMBODIMENTS

Figure 1:
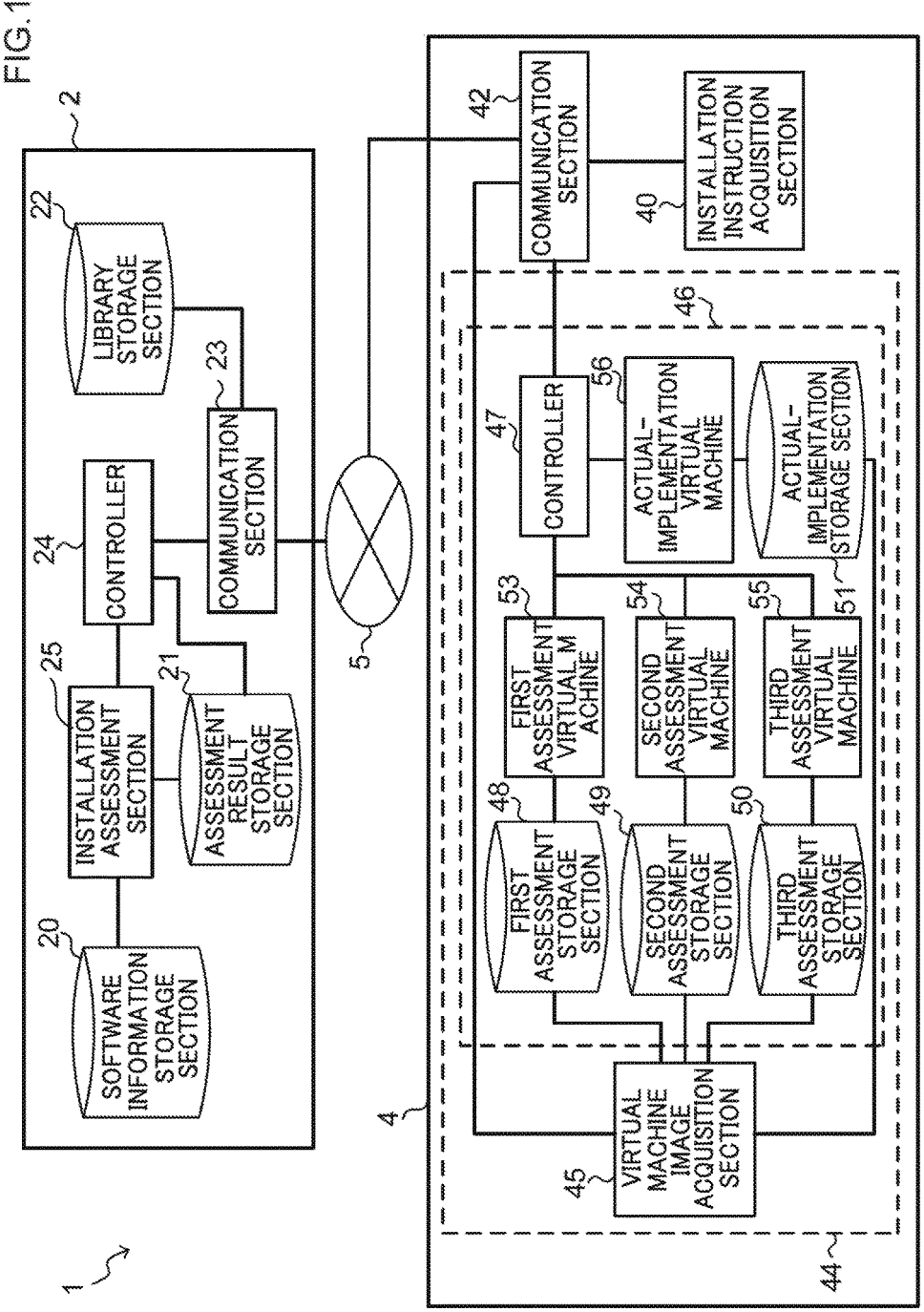
FIG. 1 is a diagram illustrating a schematic configuration of an information processing system according to an exemplary embodiment.

Detailed explanation follows regarding an example of technology disclosed herein, with reference to the drawings.

Software Installation

First, before explaining each exemplary embodiment in detail, explain follows regarding software installation and problems related thereto, and regarding an outline of a present exemplary embodiment.

When plural software items are simultaneously installed to an information processing device, labor and time is needed by a user when preliminary preparation and tasks like those described below are manually performed by the user.

As the preliminary preparation, the user, for example, prepares an installation medium (or, for example, media) and confirms software combination conditions. Next, the user confirms the software installation sequence and confirms a software installation procedure.

Next, as task items, the user performs the software installation and confirms operation. In cases in which operation has failed, the software installation sequence is modified, and the software installation and operation confirmation are repeated until operation succeeds.

The validity of software combination conditions, installation sequences, and the like to be confirmed by preliminary preparation is not something that can be found out just by examination, but is rather information obtained from past experience or actual trial and error.

A conceivable method is one in which software combinations and installation sequences for the installation target are confirmed based on actual-result data indicating combinations of software for which installation sequences have been assessed, like in conventional technology. However, in conventional technology, determination is only made as to whether or not there is an assessed software combination included in actual-result data that completely matches a software combination of an installation-target.

For example, consider a case in which determination is made as to whether or not installation of a new software combination (A, B, C) will be successful. Note that explanation follows regarding an example of a case in which there are, for example, software combinations (A, B, C, D), (A, B, D, E), and (A, B, C, D, E) of assessed installations already prepared as assessed actual-result data.

For the installation-target software (A, B, C), in cases in which the actual-result data of assessed installations is these three patterns, there is no software combination in the assessed actual-result data completely matching the installation-target software. A valid installation sequence is therefore not confirmable for the installation-target software (A, B, C). Accordingly, for example, 6 patterns for the installation sequence need to be attempted in turn based on permutations of the installation-target software (A, B, C). In such cases in which there is no actual-result data completely matching the installation-target software, the assessment time for the installation becomes longer, with a detrimental effect on installation efficiency.

For example, when considering parts, components, and finished products as respective layers in hardware, the assembly sequence in a given layer has no influence on normal operation of other layers. Namely, in hardware assembly the same order and the reverse order can be considered to have the same influence on operability.

However, in software, even introduction sequences in a given layer influence normal operation of other layers, and the same sequence or the reverse sequence can be considered to have a different influence on operability for the introduction of software.

Software will not run normally when the sequence is wrong since the installation sequence influences operation. For example, software installation sometimes needs to follow a sequence described by a manual, and the software is not able to be introduced normally when the install sequence is wrong. There is therefore a demand to be able to clearly establish the proper installation sequence when unknown software not included in actual-result data is included in the installation-target software.

In each of the exemplary embodiments below, an installation success ratio is computed representing a degree to which software items (also sometimes referred to simply as software) does or does not operate normally when software is installed to an information processing device. Then, in the exemplary embodiments, operation confirmation is performed for the information processing device according to the installation success ratio, and actual software installation is executed.

Note that in the exemplary embodiments, patterns having an already assessed install sequence from out of plural software combination patterns are referred to as assessed patterns. Patterns that run normally out of the assessed patterns are referred to as OK patterns. Patterns that do not run normally out of the assessed patterns are referred to as BAD patterns. Patterns of software for assessing installation sequences of a new software group are referred to as target patterns.

Detailed description of each exemplary embodiment is given below. Note that explanation is given in each exemplary embodiment below regarding examples of an information processing system provided with a software introduction support device that computes the installation success ratio of target patterns, and with an information processing device that installs plural software.

Exemplary Embodiment

As illustrated in FIG. 1, an information processing system 1 according to the present exemplary embodiment includes a software introduction support device 2 and an information processing device 4. The software introduction support device 2 and the information processing device 4 are, for example, connected to each other through a communication line 5 such as the internet.

Software Introduction Support Device

The software introduction support device 2 includes a communication section 23, a controller 24, and an installation assessment section 25. Moreover, a software information storage section 20, an assessment result storage section 21, and a library storage section 22 are provided in a specific region of memory allocated to the software introduction support device 2. The installation assessment section 25 is an example of an estimation section of technology disclosed herein.

For example, as illustrated in FIG. 2, a software layer table 60 and a software provision date table 61 are stored in the software information storage section 20.

The software layer table 60, for example, includes a "software" item, a "layer" item, and a "priority" item. Names of software are stored in the "software" item. Information regarding the layer the software belongs to is stored in the "layer" item. Information representing a priority of installation that accords with the layer is stored in the "priority" item.

The software provision date table 61, for example, includes a "software" item, and a "provision date" item. Software names are stored in the "software" item. Information regarding a provision date representing a date the software was provided on is stored in the "provision date" item.

As illustrated in FIG. 3, a BAD software combination table 62 and an assessed pattern table 63 are stored in the assessment result storage section 21. The assessment result storage section 21 is an example of a storage section of technology disclosed herein.

The BAD software combination table 62, for example, includes a "BAD combination" item. Combinations of non-combinable plural software items are stored in the "BAD combination" item.

The BAD software combination table 62 is a table for checking, in advance, whether or not plural software items to be installed are combinable. For example, non-combinable software information provided by software developers is registered in advance in the BAD software combination table 62. Moreover, in cases in which all of the software combination assessments described below have failed, an additional registration is made in the BAD software combination table 62 to indicate that the combination of software in question is not combinable. Each column of the BAD software combination table 62 is an example of introduction actual-result information associated with introduction success/failure.

The assessed pattern table 63, for example, includes an "assessed pattern" item, an "assessment-result information" item, and an "installation sequence" item. Information for identifying assessed patterns is stored in the "assessed pattern" item. Assessment-result information indicating whether assessed patterns are OK patterns or BAD patterns is stored in the "assessment-result information" item. Information regarding software installation sequences of assessed patterns is stored in the "installation sequence" item. OK patterns are examples of introduction actual-result information associated with successful introductions (success), and BAD patterns are examples of introduction actual-result information associated with unsuccessful introductions (failure).

Each row of the assessed pattern table 63 is an example of introduction actual-result information associating introduction sequence information with introduction success/failure. At least one or more assessed patterns are registered in the assessed pattern table 63.

Figure 4:
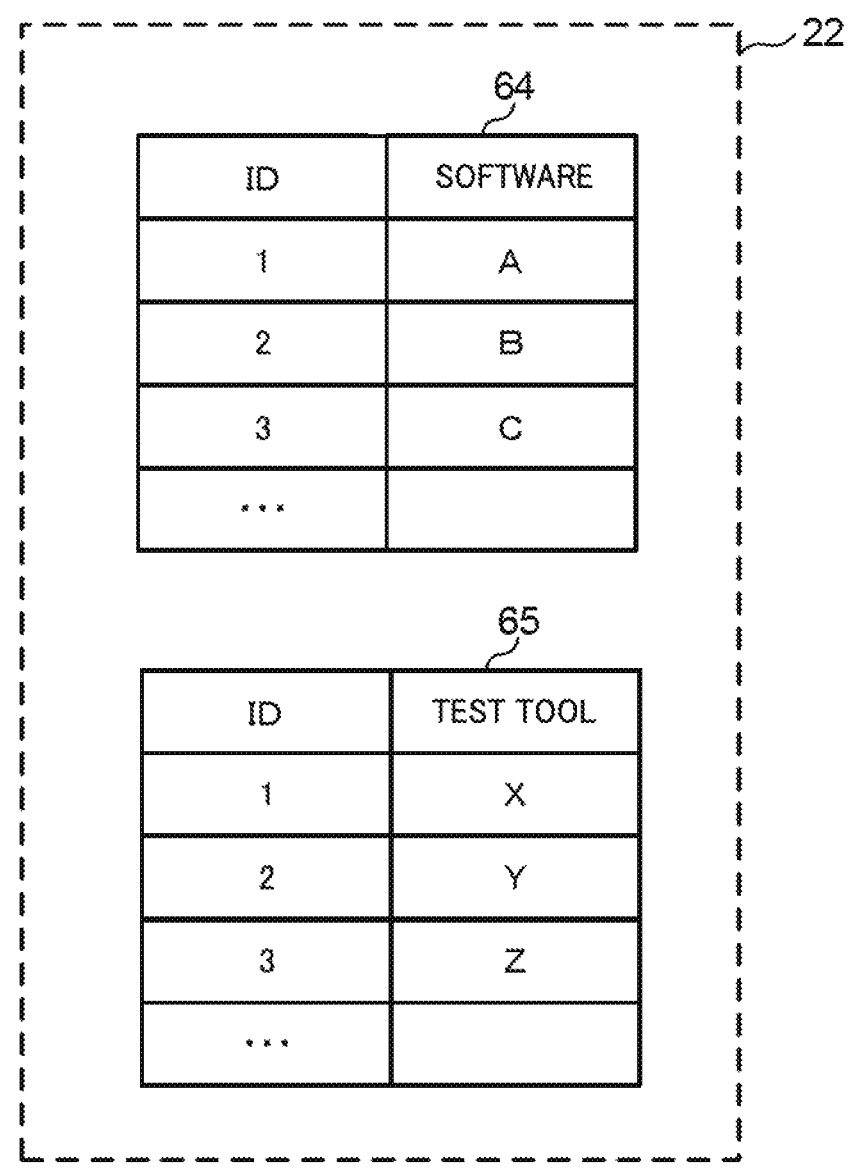

As illustrated in FIG. 4, a software library table 64 and a test tool library table 65 are stored in the library storage section 22.

Installation-target software is associated with an ID and registered in the software library table 64. Test tools are associated with IDs and registered in the test tool library table 65.

The communication section 23 receives information regarding each software item included in a new software group, serving as an installation target, transmitted from the information processing device 4, described later.

The controller 24 outputs, to the installation assessment section 25, information regarding new software groups received by the communication section 23.

The installation assessment section 25 references the assessment result storage section 21, and determines correlation between a target pattern set from information regarding the new software group output from the controller 24 and assessed patterns of the assessed pattern table 63 stored in the assessment result storage section 21.

More specifically, the installation assessment section 25 first sets as respective target patterns all the permutations of the software included in the new software group. For example, in cases in which the new software group is [A, B, C], 6 target patterns are set. The installation assessment section 25 then determines correlations between each of the plural set target patterns and the assessed patterns of the assessed pattern table 63 stored in the assessment result storage section 21.

Detailed explanation is given below regarding determination of the correlation between the installation sequence of the target pattern and the installation sequences stored in the assessment result storage section 21.

In general, when estimating whether or not unknown data will succeed, past success data is referenced, and emphasis is placed on how close (for example, how similar) past success data is to the unknown data. For example, whether elements of the past success data and of the unknown data are together, whether the sequence of each element of the past success data and each element of the unknown data are the same, and the like are employed in the estimation.

Figure 5:
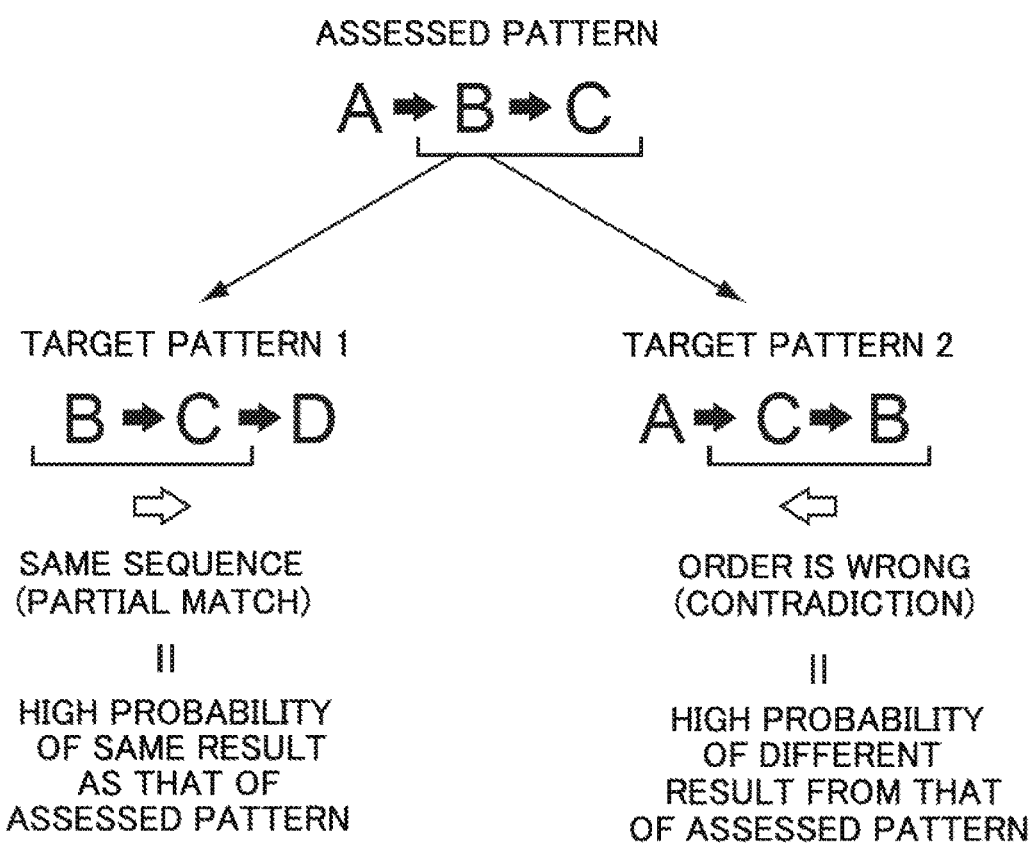
FIG. 5 is a diagram for explaining partial matches and contradictions between an assessed pattern and a target pattern.

However, even when there is similarity between software included in a target pattern and software included in an assessed pattern, as illustrated in FIG. 5, the target pattern does not necessarily actually produce the same result as the assessed pattern when the software is installed.

For example, consider a case in which software pairs sequenced following the installation sequence of a target pattern are compared against software pairs sequenced following the installation sequence of an assessed pattern.

For example, when the target pattern is "A→B→C", the respective software pairs sequenced following the installation sequence of the target pattern are ([A, B], [A, C], [B, C]).

Hereafter, software pairs sequenced following the installation sequence of a target pattern are referred to as target pattern software pairs, and software pairs sequenced following the installation sequence of an assessed pattern are referred to as assessed pattern software pairs.

When pairs of software included in the installation sequence of a target pattern and pairs of software included in the installation sequence of an assessed pattern include pairs of software in the same sequence in each pair, the target pattern has a high probability of having the same result as the assessed pattern.

However, consider a case in which, for software pairs included in the installation sequence of a target pattern and software pairs included in the installation sequence of an assessed pattern, there are pairs included with matching combinations of software included in each pair, but different sequences. In such cases, there is a higher probability that the target pattern has a different result from the assessed pattern.

Therefore, in the present exemplary embodiment, in addition to complete matching and irrelevant in installation sequences between target patterns and assessed patterns, estimation of whether or not installation of target patterns will succeed is made by also considering partial matches and contradictions in information obtained from the installation sequences.

More specifically, the installation assessment section 25 compares software pairs sequenced following the installation sequence of the target pattern against software pairs sequenced following the installation sequence of the assessed pattern.

In the present exemplary embodiment, when the target pattern completely matches the assessed pattern, this is referred to as being a complete match between the target pattern and the assessed pattern.

When target pattern software pairs and assessed pattern software pairs include a pair of software that has the same sequence, this is referred to as being a partial match between the target pattern and the assessed pattern, except in cases in which there is a complete match.

When there is a software pair included in, but having a different sequence in, the target pattern software pairs and the assessed pattern software pairs, this is referred to there being a contradiction between the target pattern and the assessed pattern.

When the number of software items matching in the software included in the installation sequence of a target pattern and software included in the installation sequence of an assessed pattern is 0 or 1, this is referred to as irrelevant.

Accordingly, the installation assessment section 25 references the assessment result storage section 21, and compares software pairs of OK patterns of the assessed pattern table 63 against the target pattern software pairs, and determines whether or not there is a partial match between an OK pattern and the target pattern. The installation assessment section 25 also compares software pairs of OK patterns of the assessed pattern table 63 against the target pattern software pairs, and determines whether or not there is a contradiction between an OK pattern and the target pattern.

The installation assessment section 25 also compares software pairs of BAD patterns of the assessed pattern table 63 against the target pattern software pairs and determines whether or not there is a partial match between a BAD pattern and the target pattern. The installation assessment section 25 also compares software pairs of the BAD patterns of the assessed pattern table 63 against the target pattern software pairs and determines whether or not there is a contradiction between a BAD pattern and the target pattern.

Next, based on the results of these determinations, the installation assessment section 25 computes an installation success ratio as an example of an estimation result representing an estimate of whether or not the installation of the target pattern will succeed.

More specifically, when determined that there is a partial match between an assessed pattern software pair of the assessed pattern table 63 and a target pattern software pair, the installation assessment section 25 reflects this as a positive element in the installation success ratio for the assessed pattern. When determined that there is a contradiction between an assessed pattern software pair of the assessed pattern table 63 and a target pattern software pair, the installation assessment section 25 reflects this as a negative element in the installation success ratio for the assessed pattern.

For example, when determined that there is a partial match between an OK pattern of the assessed pattern table 63 and the target pattern, the installation assessment section 25 computes an OK pattern match ratio $\alpha$ as an example of an element for success, and reflects this so as to increase the installation success ratio.

When determined that there is a partial match between a BAD pattern of the assessed pattern table 63 and the target pattern, the installation assessment section 25 computes a BAD pattern match ratio $\gamma$ as an example of an element for failure, and reflects this so as to lower the installation success ratio.

When determined that there is a contradiction between an OK pattern of the assessed pattern table 63 and the target pattern, the installation assessment section 25 computes an OK pattern contradiction ratio $\beta_i$ as an example of an element for failure, and reflects this so as to lower the installation success ratio. Here, i represents an index number representing an OK pattern, and the OK pattern contradiction ratio $\beta_i$ is respectively computed for n OK patterns i having a contradiction to the target pattern.

When determined that there is a contradiction between a BAD pattern of the assessed pattern table 63 and the target pattern, the installation assessment section 25 computes a BAD pattern contradiction ratio $\delta_j$ as an example of an element for success, and reflects this so as to increase the installation success ratio. Here, j is an index number representing a BAD pattern, and the BAD pattern contradiction ratio $\delta_j$ is respectively computed for m BAD patterns j having a contradiction to the target pattern.

Here, there is sometimes both a partial match and a contradiction in a single assessed pattern when comparing the assessed pattern against the target pattern and categorizing the determination results. In such cases, as already explained, although there is a higher probability the result is the same as that of the assessed pattern when a partial match is included, there is a higher probability that the result will differ from that of the assessed pattern when a contradiction is included.

Figure 6:
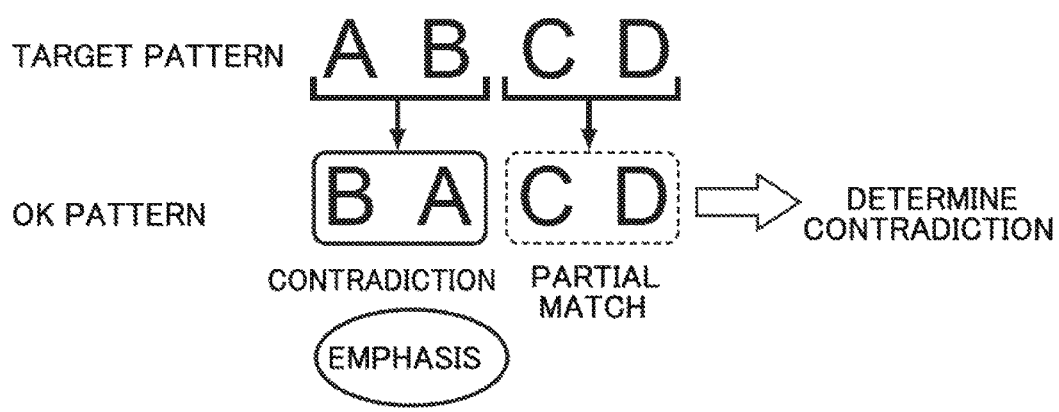
FIG. 6 is a diagram for explaining partial matches and contradictions between an assessed pattern and a target pattern.

Thus in the present exemplary embodiment, as illustrated in FIG. 6, emphasis is placed on the probability of the result differing from the OK pattern, and the contradiction determination is employed as the result in the determination result between the target pattern and the OK pattern when both a partial match and a contradiction are included.

However, the partial match determination is employed as the result in the determination result between the target pattern and the BAD pattern when both a partial match and a contradiction are included.

Accordingly, when both a partial match and a contradiction have been determined in the determination results between a target pattern and a single OK pattern, the installation assessment section 25 uses the contradiction determination and reflects this in the installation success ratio. When both a partial match and a contradiction have been determined in the determination results between a target pattern and a single BAD pattern, the installation assessment section 25 employs the partial match determination and reflects this in the installation success ratio.

Figure 7:
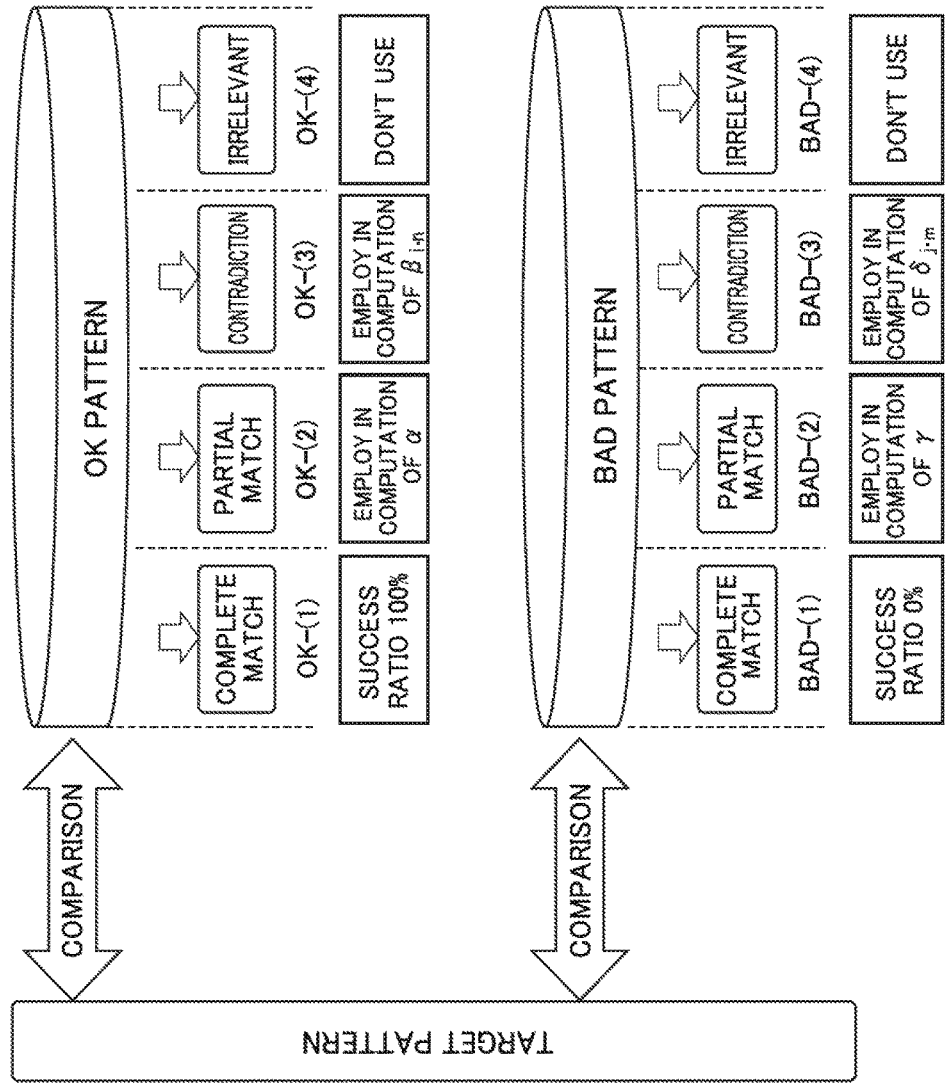
FIG. 7 is a diagram for explaining an installation success ratio.

FIG. 7 illustrates a summary of the explanation above.

As illustrated in FIG. 7, determination results between the OK patterns and the target pattern are categorized by the installation assessment section 25 as a complete match, a partial match, a contradiction, or irrelevant.

The installation success ratio is then computed as 100% in cases in which a complete match has been determined. In cases in which a partial match has been determined, the OK pattern match ratio α is computed and this is reflected in the installation success ratio. In cases in which a contradiction has been determined, the OK pattern contradiction ratio $\beta_i$ is computed and this is reflected in the installation success ratio. The installation success ratio is not computed in cases in which irrelevant has been determined.

In cases in which both a partial match and a contradiction are included, the contradiction is employed in the determination result between the target pattern and a single OK pattern, the OK pattern contradiction ratio $\beta_i$ is computed, and this is reflected in the installation success ratio.

As illustrated in FIG. 7, the results of comparing BAD patterns against the target pattern are categorized by the installation assessment section 25 as a complete match, a partial match, a contradiction, or irrelevant.

The installation success ratio is then computed as 0% in cases in which a complete match has been determined. In cases in which a partial match has been determined, the BAD pattern match ratio γ is computed, and this is reflected in the installation success ratio. In cases in which a contradiction has been determined, the BAD pattern contradiction ratio $\delta_j$ is computed, and this is reflected in the installation success ratio. In cases in which irrelevant has been determined, this is not reflected in the installation success ratio.

When the determination result between the target pattern and a single BAD pattern includes both a partial match and a contradiction, the partial match is employed, the BAD pattern match ratio γ is computed, and this is reflected in the installation success ratio.

Installation Success Ratio

Next, detailed explanation follows regarding the installation success ratio computed by the installation assessment section 25, and the OK pattern match ratio α, the OK pattern contradiction ratio $\beta_i$, the BAD pattern match ratio γ, and the BAD pattern contradiction ratio $\delta_j$ to be reflected in the installation success ratio.

In the present exemplary embodiment, the installation success ratio is expressed by Equation (1) below.

$$\alpha \cdot \{\Pi_{i=1}^{n}(1-\beta_i)\} \cdot (1-\gamma) \cdot \Pi_{j=1}^{m}\delta_j \quad (1)$$

n in Equation (1) represents the number of OK patterns having a contradiction to the target pattern. m in Equation (1) represents the number of BAD patterns having a contradiction to the target pattern.

OK Pattern Match Ratio α

More specific explanation follows regarding the method of computing the OK pattern match ratio α in Equation (1). In cases in which it is determined that there is a partial match between the OK pattern of the assessed pattern table 63 and the target pattern, the OK pattern match ratio α is computed as the proportion of the target pattern software pairs and the assessed pattern software pairs that match each other.

The OK pattern match ratio α is represented by Equation (2) below.

$$\alpha = \alpha_1 + (\varphi - \alpha_1) \cdot (-e^{-x} + 1) \quad (2)$$

The $\alpha_1$ in Equation (2) is a ratio between the number of software pairs in the OK pattern having the most matches with the respective target pattern software pairs, and the partial match software pairs out of the target pattern software pairs, and is referred to as the OK pattern maximum partial-match-pair content ratio $\alpha_1$. More specifically, the OK pattern maximum partial-match-pair content ratio $\alpha_1$ is the maximum value, from out of values for each of plural OK patterns, of a ratio of the number of target pattern software pairs that matched a software pair of the OK pattern, and the number of pairs included in a pair group of the software pairs in the OK pattern. The OK pattern maximum partial-match-pair content ratio $\alpha_1$ is the minimum value of the OK pattern match ratio α.

The OK pattern maximum partial-match-pair content ratio $\alpha_1$ is represented by Calculation Equation (3) below.

$$\alpha_1 = \text{MAX(number of partial-match target pattern software pairs/number of pairs in respective OK pattern)} \quad (3)$$

Here, (number of partial-match target pattern software pairs/number of pairs in respective OK pattern) is referred to as the partial-match-pair content ratio.

For example, consider a case in which two OK patterns like those illustrated in FIG. 8 are registered in the assessed pattern table 63 for the target pattern [B, C, D].

The target pattern software pairs are ([B, C], [B, D], [C, D]). The software pairs of an assessed pattern 1, which is an OK pattern, are ([A, B], [A, C], [A, D], [B, C], [B, D], [C, D]). The software pairs of an assessed pattern 2, which is an OK pattern, are ([A, B], [A, D], [B, D]).

The partial-match-pair content ratio of the OK pattern of assessed pattern 1 and the partial-match-pair content ratio of the OK pattern of assessed pattern 2 are expressed by the equations below.

partial-match-pair content ratio=number of partial-match target pattern software pairs (3 in this example)/number of software pairs in OK pattern 1 (6 in this example)

partial-match-pair content ratio=number of partial-match target pattern software pairs (1 in this example)/number of software pairs in OK pattern 2 (3 in this example)

Accordingly, since the partial-match-pair content ratio of the OK pattern of assessed pattern 1 is the larger, this partially matched pair content ratio (=3/6=1/2) is the OK pattern maximum partial-match-pair content ratio $\alpha_1$.

Next, explanation follows regarding a partial-match-pair species coverage ratio φ in Equation (2). The partial-match-pair species coverage ratio φ is expressed by Equation (4) below.

$$\varphi = \text{number of types of all software pairs in OK patterns having a match to a part included in the target pattern/number of types of target pattern software pairs} \quad (4)$$

As expressed by Equation (4), a coverage ratio between the number of types of all partially matched software pairs in the OK patterns, and the number of types of target pattern software pairs is denoted by the partial-match-pair species coverage ratio φ. The partial-match-pair species coverage ratio φ is the maximum value of the OK pattern match ratio α.

Figure 9:
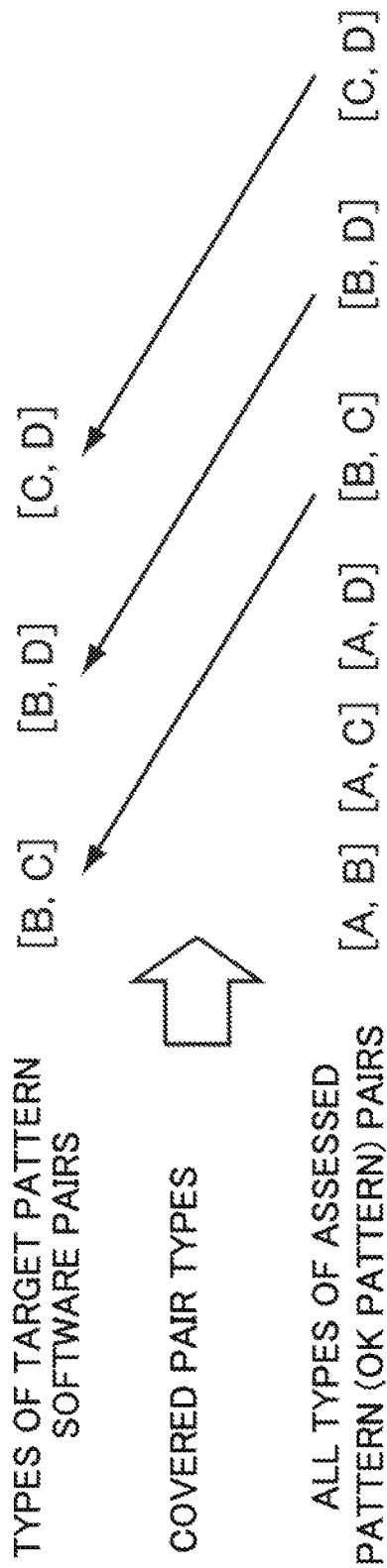
FIG. 9 is a diagram for explaining a partial-match-pair species coverage ratio.

For example, FIG. 9 illustrates a case in which the software pairs of the target pattern [B, C, D] (these being [B, C], [B, D], [C, D]) are covered by the software pairs of all of the OK patterns ([A, B], [A, C], [A, D], [B, C], [B, D], [C, D]). In FIG. 9, the software pairs of the target pattern (3 in this example) are covered by the pairs of the OK pattern (6 in this example). Accordingly, in this case, the partial-match-pair species coverage ratio=3/3.

Next, explanation follows regarding x in Equation (2). The x is expressed by Equation (5) below.

$$x = \Sigma \text{ number of types of partially matched OK pattern software pairs/number of types of target pattern software pairs} \quad (5)$$

The Σ in Equation (5) indicates summing of the number of types of partially matched OK pattern software pairs, and the numerator is the total of the number of types of software pairs in the OK patterns partially matching the target pattern.

For example, when the types of target pattern software pairs are ([B, C], [B, D], [C, D]) and the types of partially matched OK pattern software pairs are ([B, C], [B, D], [C, D]), x=3/3=1 according to Equation (5).

Figure 10:
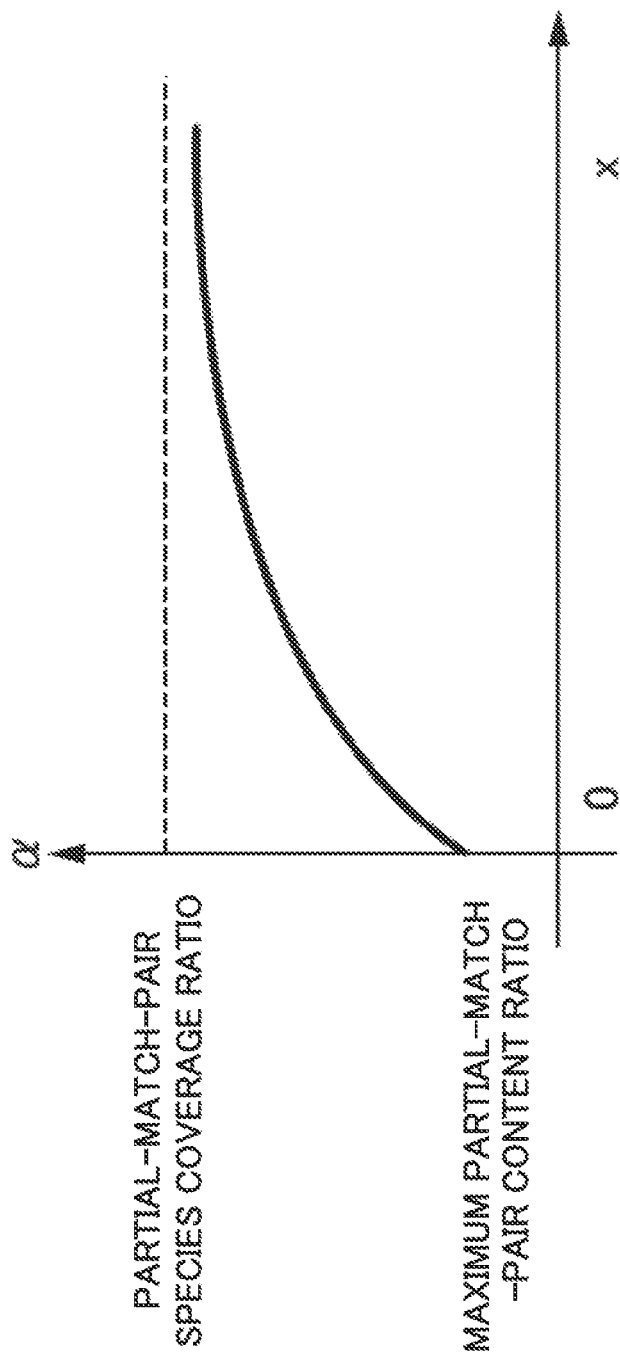
FIG. 10 is a diagram for explaining OK pattern match ratios.

As the x expressed by Equation (5) gets greater, the OK pattern match ratio α gets greater and approaches the partial-match-pair species coverage ratio φ, and hence the OK pattern match ratio α can be represented by the graph illustrated in FIG. 10.

When each value in the example explained above is employed to compute the installation success ratio, the following results.

$$\alpha = 1/2 + (1 - 1/2) \cdot (-e^{-1} + 1)$$
$$= 0.815 \rightarrow 81.5\%$$

Note that the OK pattern maximum partial-match-pair content ratio $\alpha_1$ alone may be used as the OK pattern match ratio α. However, in such cases, a difference in the predicted installation success ratio may sometimes not be computable. Explanation of an example of such a case follows.

For example, explanation follows regarding an example of a case in which the target pattern is [A, B, C, D] and the target pattern software pairs are ([A, B], [A, C], [A, D], [B, C], [B, D], [C, D]). Moreover, explanation follows regarding a case in which the assessed patterns illustrated in FIG. 11 are registered in the assessed pattern table 63.

The software pairs of the OK pattern of assessed pattern 1 illustrated in FIG. 11 are ([A, B], [A, C], [B, C]). Moreover, the software pairs of the OK pattern of assessed pattern 2 are ([C, D]).

As illustrated in FIG. 11, when the target pattern software pairs are compared against the software pairs of the OK pattern of assessed pattern 1, the partial-match-pair content ratio is 1/2 since the software pairs ([A, B], [A, C], [B, C]) are common. When the target pattern software pairs are compared against the software pairs of the OK pattern of assessed pattern 1, the partial-match-pair content ratio is 1/6 since the software pair ([C, D]) is common.

Next, FIG. 12 illustrates a diagram representing relationships between the maximum partial-match-pair content ratio computed based on each of the assessed patterns, and actual success ratios. As illustrated in FIG. 12, for example, in cases in which only the assessed pattern 1 has been registered in the assessed pattern table 63, the maximum partial-match-pair content ratio is 1/2, and the result corresponds to the actual success ratio.

However, in cases in which the assessed pattern 1 and the assessed pattern 2 have been registered in the assessed pattern table 63, the maximum partial-match-pair content ratio and the actual success ratio produce different result in some cases. As illustrated in FIG. 12, in cases in which the assessed pattern 1 and the assessed pattern 2 have been registered, although the maximum partial-match-pair content ratio is 1/2, the actual success ratio is 1/2 or greater. When the above two actual success ratios are compared, although the success ratio is a value greater than 1/2 when the pattern 2 is present, this difference is not computed in cases in which the maximum partial-match-pair content ratio is employed alone.

Accordingly, in the present exemplary embodiment, as expressed by Equation (2), not only the OK pattern maximum partial-match-pair content ratio $\alpha_1$, but also the partial-match-pair species coverage ratios φ and x are taken into consideration when computing the OK pattern match ratio α.

Note that in cases in which there are no OK patterns that partial match the target pattern present in the assessed pattern table 63, the number of target pattern pairs is compared against the maximum number of pairs in an OK pattern, the larger is taken as the denominator, the smaller is taken as the numerator, and a provisional OK pattern match ratio α is set. More specifically, the OK pattern match ratio α is set as expressed by the equation below.

OK pattern match ratio α=the smaller number of pairs from a comparison of the number of target pattern pairs against the maximum number of pairs in an OK pattern/the larger number of pairs from a comparison of the number of target pattern pairs against the maximum number of pairs in an OK pattern BAD Pattern Match Ratio γ

Next, explanation follows regarding a computation method for the BAD pattern match ratio γ in Equation (1). Note that this is reflected in the installation success ratio by subtracting the BAD pattern match ratio γ from 1, such that the lower the BAD pattern match ratio γ, the higher the installation success ratio.

The BAD pattern match ratio γ is calculated by a similar computation method to that of the OK pattern match ratio α.

In cases in which it is determined that there is a partial match between a BAD pattern of the assessed pattern table 63 and the target pattern, the BAD pattern match ratio γ is computed as the proportion of the matched software pairs that are sequenced following the installation sequence.

The BAD pattern match ratio γ is expressed by Equation (6) below.

$$\gamma = \gamma_1 + (\sigma - \gamma_1) \cdot (-e^{-y} + 1) \quad (6)$$

The $\gamma_1$ in Equation (6) is a ratio between the number of software pairs of the BAD pattern having the most matches with the respective target pattern software pairs, and the partial-match software pairs out of the target pattern software pairs, and is referred to as the BAD pattern maximum partial-match-pair content ratio $\gamma_1$. More specifically, the BAD pattern maximum partial-match-pair content ratio $\gamma_1$ is the maximum value, respectively found for plural BAD patterns, for the ratio between the number of target pattern software pairs that match with a software pair of a BAD pattern, and the number of pairs included in the pair group of software pairs of that BAD pattern. The BAD pattern maximum partial-match-pair content ratio $\gamma_1$ is the minimum value of the BAD pattern match ratio γ.

The BAD pattern maximum partial-match-pair content ratio $\gamma_1$ is expressed by Calculation Equation (7) below.

$\gamma_1$=MAX(number of partial-match target pattern software pairs/number of pairs in respective BAD pattern)

Next, explanation follows regarding the partial-match-pair species coverage ratio σ in Equation (6). The partial-match-pair species coverage ratio σ is expressed by Equation (8) below.

σ=number of types of all software pairs in BAD patterns having a match to a part included in the target pattern/number of types of target pattern software pairs (8)

As expressed by Equation (8), a coverage ratio between the number of types of all of the partial-match software pairs in the BAD pattern, and the number of types of target pattern software pairs is denoted by the partial-match-pair species coverage ratio σ. The partial-match-pair species coverage ratio σ is the maximum value of the BAD pattern match ratio γ.

Next, explanation follows regarding the y in Equation (6). The y is expressed by Equation (9) below.

y=Σ number of types of partially matched BAD pattern software pair/number of types of target pattern software pair    (9)

The Σ in Equation (9) indicates summing of the number of types of partially matched software pairs of the BAD pattern, and the numerator is the total number of types of software pairs in the BAD pattern partially matching the target pattern.

Note that, similarly to the OK pattern match ratio α, the BAD pattern match ratio γ is also computed, as expressed by Equation (6), in consideration of not only the BAD pattern maximum partial-match-pair content ratio $γ_1$, but also in consideration of the partial-match-pair species coverage ratios σ and y.

Note that in cases in which there are no BAD patterns that partially match the target pattern present in the assessed pattern table 63, γ is set to 0 such that (1−γ)=1, since there are no assessed patterns to be taken into consideration.

OK Pattern Contradiction Ratio $β_i$

Next, explanation follows regarding a specific computation method for the OK pattern contradiction ratio $β_i$ in Equation (1).

The target pattern and an OK pattern are compared, and the OK pattern contradiction ratio $β_i$ is computed as the proportion of pairs having a reversed installation sequence.

The OK pattern contradiction ratio $β_i$ is expressed as a ratio between the greater number of pairs from out of the number of the OK pattern software pairs or the number of the target pattern software pairs, and the number of pairs in the lesser pair group having a contradiction with the software pairs included in the greater pair group.

More specifically, the target pattern or the OK pattern having the greater number of included software items is set as the maximum side software, and the pattern having the lesser is set as the minimum side software, and the OK pattern contradiction ratio $β_i$ for the OK pattern i is calculated according to Equation (10) below. Note that in cases in which the same number of software items is included in the target pattern and the OK pattern, the target pattern is set as the maximum side software and the OK pattern, which is an assessed pattern, is set as the minimum side software.

$β_i$=number of pairs of minimum side software having contradictions/number of combinations of all pairs of maximum side software    (10)

For example, consider the OK pattern contradiction ratio $β_i$ when the target pattern is [B, C, A] for the OK patterns illustrated in FIG. 13.

When the OK pattern of assessed pattern 1 illustrated in FIG. 13 is compared against the target pattern, the target pattern [B, C, A] is set as the maximum side software, and the OK pattern [C, B] of the assessed pattern 1 is set as the minimum side software. Then, the OK pattern contradiction ratio $β_1$ between the target pattern and the OK pattern of assessed pattern 1 is calculated according to Equation (10).

FIG. 14 is a diagram illustrating an explanation of calculating the OK pattern contradiction ratio $β_1$ between the OK pattern [C, B] of the assessed pattern 1 illustrated in FIG. 13, and the target pattern [B, C, A]. As illustrated in FIG. 14, a) the maximum side software [B, C, A] is compared against b) the minimum side software [C, B], and the OK pattern contradiction ratio $β_1$ between the target pattern and the OK pattern of assessed pattern 1 is 1/3.

Next, in cases in which the OK pattern of the assessed pattern 2 illustrated in FIG. 14, is compared against the target pattern, the target pattern [B, C, A] is set as the maximum side software, and the OK pattern [A, C, E] of the assessed pattern 2 is set as the minimum side software. Then, an OK pattern contradiction ratio $β_2$ between the target pattern and the OK pattern of the assessed pattern 2 is calculated according to Equation (10).

FIG. 15 illustrates a result of calculating the OK pattern contradiction ratio between the OK pattern 2 illustrated in FIG. 13, and the target pattern [B, C, A]. As illustrated in FIG. 15, a) the maximum side software [B, C, A] is compared against b) the minimum side software [A, C, E], and the OK pattern contradiction ratio $β_2$ between the target pattern and the OK pattern of the assessed pattern 2 is 1/3.

The greater the number of contradictions between the target pattern and the OK pattern, the lower the installation success ratio, and so for the calculation result of the above example, all the values of the OK pattern contradiction ratios $β_i$ subtracted from 1 are then multiplied together, as indicated below.

(1−$β_1$ for OK pattern of assessed pattern 1)×(1−$β_2$ for OK pattern of assessed pattern 2)=(1−1/3)×(1−1/3)=4/9

However, in cases in which the assessed pattern has no contradictions, since there is no data to be referenced, $β_i$ is set to 0 such that the equation below is satisfied.

$\{\Pi_{i=1}^n(1-β_i)\}=1$

BAD Pattern Contradiction Ratio $δ_j$

Next, explanation follows regarding a specific computation method for the BAD pattern contradiction ratio $δ_j$ in Equation (1).

The target pattern is compared against a BAD pattern, and the BAD pattern contradiction ratio $δ_j$ is computed as the proportion of pairs having a reversed installation sequence.

The BAD pattern contradiction ratio $δ_j$ is expressed as the ratio between the greater number of pairs from out of the number of the BAD pattern software pairs or the number of the target pattern software pairs, and the number of pairs in the lesser pair group having a contradiction with the software pairs included in the greater pair group.

More specifically, the target pattern or the BAD pattern having the greater number of included software items is set as the maximum side software, and the pattern having the lesser is set as the minimum side software, and the BAD pattern contradiction ratio $δ_j$ for the BAD pattern j is calculated according to Equation (11) below. Note that in cases in which the same number of software items is included in the target pattern and the BAD pattern, the target pattern is set as the maximum side software and the BAD pattern, which is an assessed pattern, is set as the minimum side software.

$δ_j$=number of pairs of minimum side software having contradictions/number of combinations of all pairs of maximum side software    (11)

The greater the number of contradictions between the target pattern and the BAD patterns, the higher the installation success ratio, and $δ_j$ is therefore reflected in the computation equation of the installation success ratio of Equation (1) without being subtracted from 1.

However, in cases in which the assessed pattern has no contradictions, since there is no data to be referenced, $\delta_j$ is set to 1 such that the equation below is satisfied.

$$\Pi_{j=1}^m \delta_j = 1$$

As explained above, each of the values for the OK pattern match ratio $\alpha$, the OK pattern contradiction ratio $\beta i$, the BAD pattern match ratio $\gamma$, and the BAD pattern contradiction ratio $\delta_j$ is reflected in the installation success ratio, and the estimation result is computed according to Equation (1).

However, in cases of irrelevant, in which the target pattern is compared against the assessed pattern and there is neither a partial match nor a contradiction, the target pattern is set as the final test sequence in the information processing device 4, described later, since there is no data present to compare against.

Here, explanation follows regarding an example of computing the installation success ratio, with reference to FIG. 16. Note that in the example of FIG. 16, an example is illustrated in which the installation success ratio is computed for (a) a target pattern 1, which has partial matches to the OK pattern, and (b) a target pattern 2, which has contradictions to the OK pattern. Note that in the example of FIG. 16, explanation is given with the assumption that the OK pattern match ratio $\alpha$ is 3/6, the BAD pattern match ratio $\gamma$ is 0, and the BAD pattern contradiction ratio $\delta_j$ is 1.

In the example of FIG. 16, the assessed pattern is an OK pattern, and the new software group that is the target for computation of the installation success ratio is [A, B, C].

As illustrated in FIG. 16, the installation sequence of the OK pattern is [A→B→C→D], and the software pairs that accord with the installation sequence of the OK pattern are [A, B], [A, C], [A, D], [B, C], [B, D], and [C, D].

In the example of FIG. 16, for the new software group [A, B, C], both a target pattern 1 corresponding to a calculation target (a), and a target pattern 2 corresponding to a calculation target (b) are considered. The installation sequence of the target pattern 1 is [A→B→C], and the installation sequence of the target pattern 2 is [C→B→A].

The software pairs that accord with the installation sequence of the target pattern 1 are [A, B], [A, C], and [B, C]. Moreover, the software pairs that accord with the installation sequence of the target pattern 2 are [C, B], [C, A], [B, A].

Since the result of determining the correlation between the OK pattern software pairs and the software pairs of the target pattern 1 is that there are only partial matches present. The determination result is the partial matches illustrated in FIG. 16. Thus, the OK pattern contradiction ratio $\beta_i$ is 0, and the installation success ratio of the target pattern 1 is computed according to Equation (1) as $3/6 \times 1 \times 1 \times 1 = 0.5$, which is 50%.

However, the result of determining the correlation between the OK pattern software pairs and the software pairs of the target pattern 2 is that there are no partial matches present, and only contradictions are included, so the determination result is the contradictions illustrated in FIG. 16. Thus, the number of combinations of all pairs of the maximum side software is 6, the number of pairs of minimum side software having contradictions is 3, and the OK pattern contradiction ratio $\beta_i$ is 1/2. Accordingly, the installation success ratio of the target pattern 2 is computed according to Equation (1) as $3/6 \times (1-1/2) \times 1 \times 1 = 0.25$, which is 25%.

According to the result illustrated in FIG. 16, the target pattern 1 (having partial matches) has a higher probability of having the same result as the OK pattern, and the target pattern 2 (having contradictions) has a higher probability of having a different result to the OK pattern.

Next, the installation assessment section 25 reorders the target patterns in descending order of installation success ratio based on the installation success ratio for of each of the target patterns. The installation assessment section 25 then determines whether or not there are any installation success ratios that are the same ratio present, based on a combination of the target patterns reordered in accordance with their installation success ratios, and their installation success ratios.

The installation assessment section 25 then references the software layer table 60 stored in the software information storage section 20, and reorders any target patterns having the same installation success ratio based on a priority in accordance with the layer that the software included in the target pattern belongs to.

Figure 17:
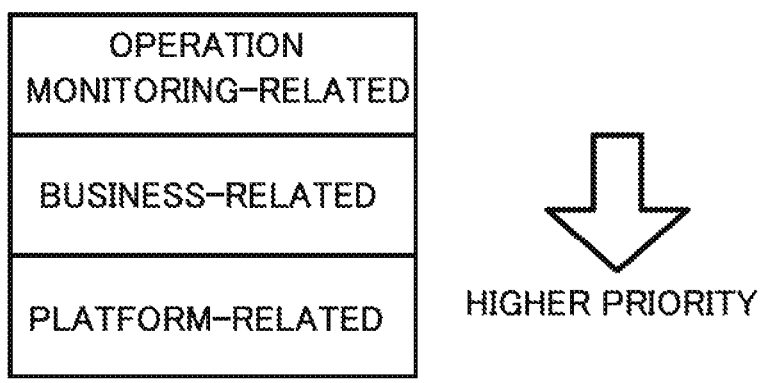
FIG. 17 is a diagram for explaining priorities according to software layer.

For example, as illustrated in FIG. 17, the layers of the software are divided into platform-related, business-related, and operation monitoring-related software and pre-set in the software layer table 60 so as to give higher priority to software closer to the platform-related software. Note that a higher priority indicates an earlier position in the installation sequence.

For example, in cases in which the software layer table 60 illustrated in FIG. 2 is employed, when the target patterns [A, B, C] and [A, C, B] have the same installation success ratio, the priorities according to the layers are compared for the software B, C having different sequences from the software included in the target pattern. The installation priorities increase in the order [A, B, C][A, C, B].

The installation assessment section 25 also references the software provision date table 61 stored in the software information storage section 20. The installation assessment section 25 then reorders target patterns having the same installation success ratio, in accordance with the provision dates of the software included in the target pattern.

Due to there being a higher probability that any limitations to installation have been removed the earlier the provision date of the software, when the installation success ratios are the same, the software with the earlier software provision date is installed first.

For example, in cases in which the software provision date table 61 illustrated in FIG. 2 is employed, when [A, B, C] and [A, C, B] have the same installation success ratio, the installation priority is the sequence [A, B, C][A, C, B] since the software B has a sooner provision date.

The installation assessment section 25 also reorders target patterns that have the same installation success ratio according to names of software included in the target pattern.

The installation assessment section 25 outputs, to the controller 24, a target pattern assessment instruction including plural combinations of the reordered target patterns and the installation success ratios corresponding to the target patterns.

The controller 24 outputs, to the communication section 23, the target pattern assessment instruction output by the installation assessment section 25.

The communication section 23 transmits, through the communication line 5 to the information processing device 4, the target pattern assessment instruction output by the controller 24.

The controller 24 also reads respective specific software items and test tools from the software library table 64 and the test tool library table 65 stored in the library storage section 22, based on a software test tool request instruction received by the communication section 23. The controller 24 then outputs the respective specific software items and the test tools to the communication section 23. The communication section 23 transmits, through the communication line 5 to the information processing device 4, the respective specific software items and the test tools output by the controller 24.

The controller 24 stores the installation-assessment results received by the communication section 23 in the assessment result storage section 21. The controller 24 then, based on the installation assessment-result, outputs an installation execution instruction for at least one out of the target patterns for which installation succeeded. The communication section 23 then transmits, through the communication line 5 to the information processing device 4, the installation execution instruction output by the controller 24.

Information Processing Device

The information processing device 4, for example, is a personal computer or the like, and functions to install plural software items. As illustrated in FIG. 1, the information processing device 4 includes an installation instruction acquisition section 40, a communication section 42, and a virtual environment section 44.

The virtual environment section 44 includes a virtual machine image acquisition section 45 and a user environment section 46. The user environment section 46 includes a controller 47, a first assessment virtual machine 53, a second assessment virtual machine 54, a third assessment virtual machine 55, and an actual-implementation virtual machine 56. Moreover, a first assessment storage section 48, a second assessment storage section 49, a third assessment storage section 50, and an actual-implementation storage section 51 are provided in a specific region of memory allocated to the information processing device 4.

The installation instruction acquisition section 40 acquires a new software group installation instruction input by the user.

The communication section 42 transmits, through the communication line 5 to the software introduction support device 2, information regarding new software groups acquired by the installation instruction acquisition section 40. The communication section 42 receives a target pattern assessment instruction transmitted from the software introduction support device 2, and outputs the received target pattern assessment instruction to the virtual machine image acquisition section 45 and the controller 47.

When the target pattern assessment instruction output by the communication section 42 is acquired, the virtual machine image acquisition section 45 replicates and acquires a virtual machine image that is stored in a predetermined storage region of the information processing device 4. A virtual machine image is a single group of data that includes an OS and plural software items. When the virtual machine image is loaded on the first assessment virtual machine 53, the second assessment virtual machine 54, the third assessment virtual machine 55, and the actual-implementation virtual machine 56, the virtual machine image installed with the OS and the plural software items is started up.

The virtual machine image acquisition section 45 then stores the acquired virtual machine image in the first assessment storage section 48, the second assessment storage section 49, and the third assessment storage section 50.

Figure 18:
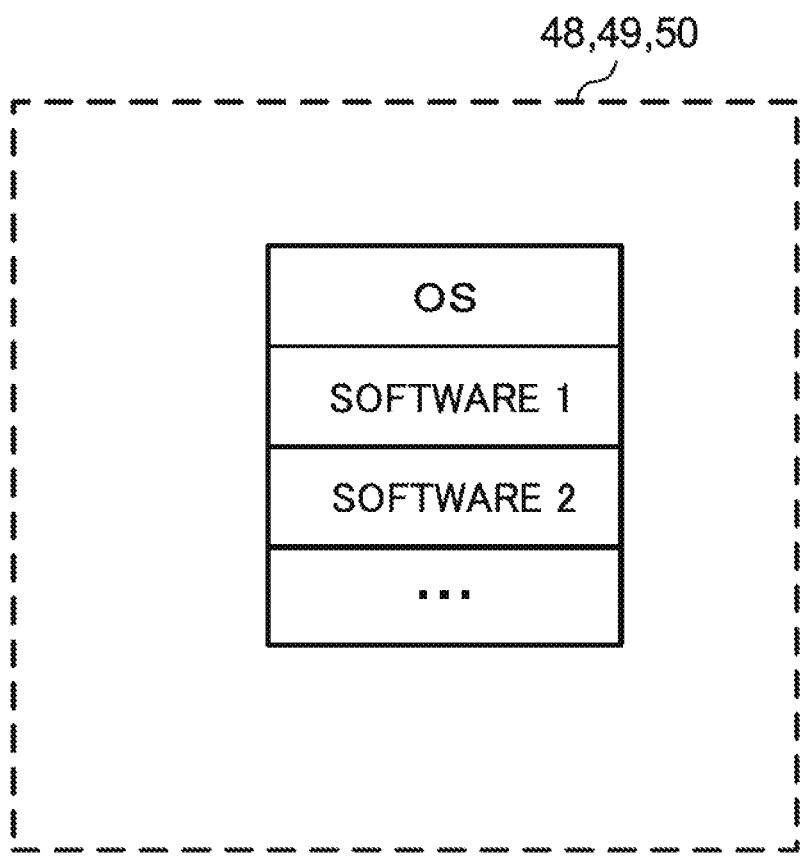
FIG. 18 is a diagram illustrating an example of a virtual machine image.

As illustrated in FIG. 18, the OS and plural software items included in the virtual machine image are stored in the first assessment storage section 48, the second assessment storage section 49, and the third assessment storage section 50.

The controller 47 acquires the target pattern assessment instruction output by the communication section 42. The controller 47 then instructs the first assessment virtual machine 53, the second assessment virtual machine 54, and the third assessment virtual machine 55 to assess target patterns in accordance with the installation success ratio included in the target pattern assessment instruction.

For example, explanation follows regarding an example of a case in which the new software group is [A, B, C]. In this case, there are 6 target patterns, and the installation success ratio is computed by the software introduction support device 2 for all of the target patterns.

For example, the controller 47 outputs an assessment instruction to the first assessment virtual machine 53 to assess the target patterns [A→B→C] and [A→C→B]. The controller 47 also outputs an assessment instruction to the second assessment virtual machine 54 to assess the target patterns [B→A→C] and [B→C→A]. The controller 47 also outputs an assessment instruction to the third assessment virtual machine 55 to assess the target patterns [C→A→B] and [C→B→A].

Here, the controller 47 outputs the assessment instruction to the first assessment virtual machine 53, the second assessment virtual machine 54, and the third assessment virtual machine 55 in order of highest installation success ratio, and ends assessment at the point when installation has succeeded.

The first assessment virtual machine 53 loads the virtual machine image stored in the first assessment storage section 48 and, in response to the assessment instruction output by the controller 47, performs installation assessment of the software in accordance with the target pattern installation sequence.

The second assessment virtual machine 54 loads the virtual machine image stored in the second assessment storage section 49 and, in response to the assessment instruction output by the controller 47, performs installation assessment of the software in accordance with the target pattern installation sequence.

The third assessment virtual machine 55 loads the virtual machine image stored in the third assessment storage section 50 and, in response to the assessment instruction output by the controller 47, performs installation assessment of the software in accordance with the target pattern installation sequence.

In order to perform installation assessment, the specific software and the specific test tools are downloaded from the software library table 64 and the test tool library table 65 stored in the library storage section 22 of the software introduction support device 2.

The first assessment virtual machine 53, the second assessment virtual machine 54, and the third assessment virtual machine 55 then output installation-assessment results to the controller 47.

The controller 47 outputs, to the communication section 42, the installation-assessment results output from the first assessment virtual machine 53, the second assessment virtual machine 54, and the third assessment virtual machine 55. The communication section 42 transmits, through the communication line 5 to the software introduction support device 2, the installation-assessment results output by the controller 47.

When the communication section 42 has received the actual-implementation environment settings and installation instruction transmitted from the software introduction support device 2, the communication section 42 also outputs the actual-implementation environment settings and the installation instruction to the controller 47. The controller 47 then, based on the actual-implementation environment settings and the installation instruction, performs settings such that the actual-implementation virtual machine 56 functions.

The actual-implementation virtual machine 56 then, in response to the installation instruction output by the controller 47, downloads the respective specific software items from the software library table 64 stored in the library storage section 22 of the software introduction support device 2.

The actual-implementation virtual machine 56 then installs each software item of the plural downloaded software items in turn according to the installation instruction.

Figure 19:
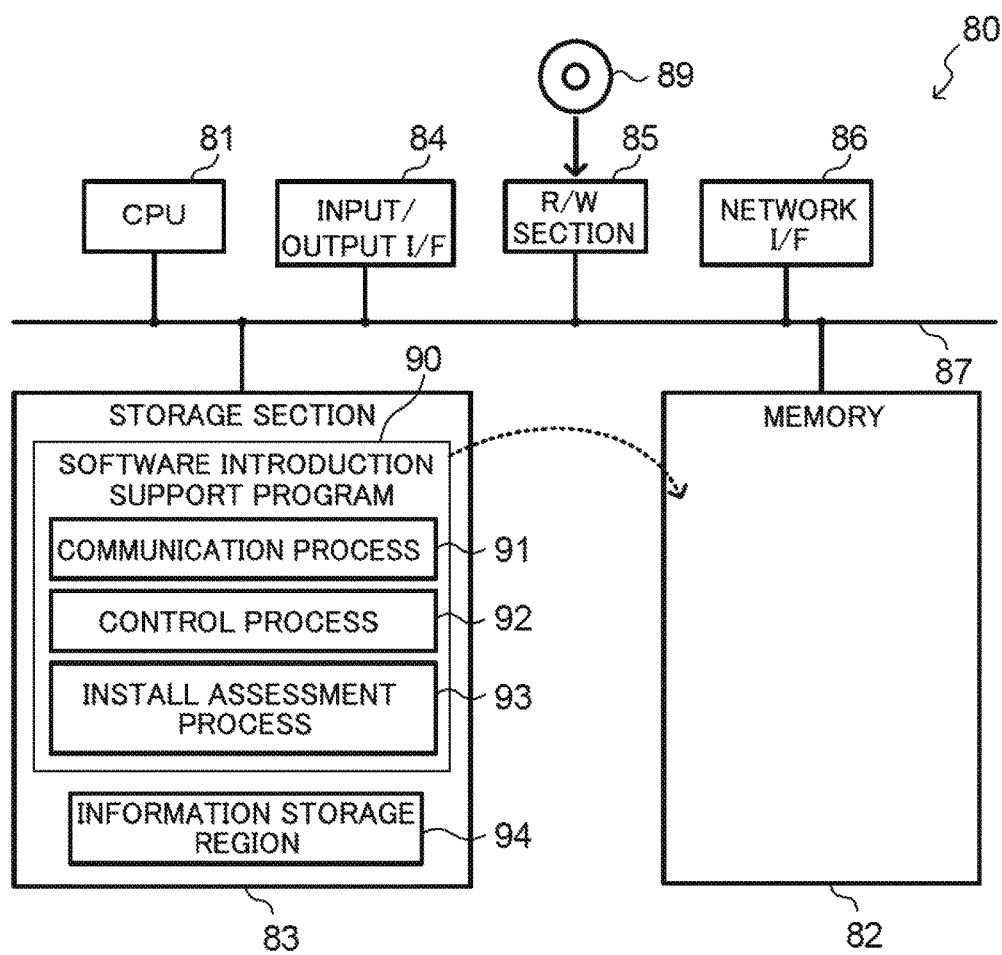
FIG. 19 is a block diagram illustrating a schematic configuration of a computer that functions as a software introduction support device.

The software introduction support device 2 may, for example, be implemented by the computer 80 illustrated in FIG. 19. The computer 80 includes a CPU 81, memory 82 serving as a temporary storage region, and a non-volatile storage section 83. The computer 80 includes an input/output I/F 84, a read/write (R/W) section 85 that controls reading and writing of data from and to a recording medium 89, and a network I/F 86 that connects to a network such as the internet. The CPU 81, the memory 82, the storage section 83, the input/output I/F 84, the R/W section 85, and the network I/F 86 are connected to one another through a bus 87.

The storage section 83 may be implemented by a hard disk drive (HDD), a solid state drive (SSD), flash memory, or the like. A software introduction support program 90 for causing the computer 80 to function as the software introduction support device 2 is stored in the storage section 83, which serves as a storage medium. The software introduction support program 90 includes a communication process 91, a control process 92, and an install assessment process 93. The storage section 83 includes an information storage region 94 that stores information configuring the software information storage section 20, the assessment result storage section 21, and the library storage section 22.

The CPU 81 reads the software introduction support program 90 from the storage section 83, expands the software introduction support program 90 into the memory 82, and sequentially executes each of the processes included in the software introduction support program 90.

The CPU 81 operates as the communication section 23 illustrated in FIG. 1 by executing the communication process 91. The CPU 81 also operates as the controller 24 illustrated in FIG. 1 by executing the control process 92. The CPU 81 also operates as the installation assessment section 25 illustrated in FIG. 1 by executing the install assessment process 93.

In this manner, the computer 80 executing the software introduction support program 90 functions as the software introduction support device 2.

Note that functionality implemented by the software introduction support program 90 may, for example, be implemented by a semiconductor integrated circuit, and more specifically, by an application specific integrated circuit (ASIC) or the like.

Figure 20:
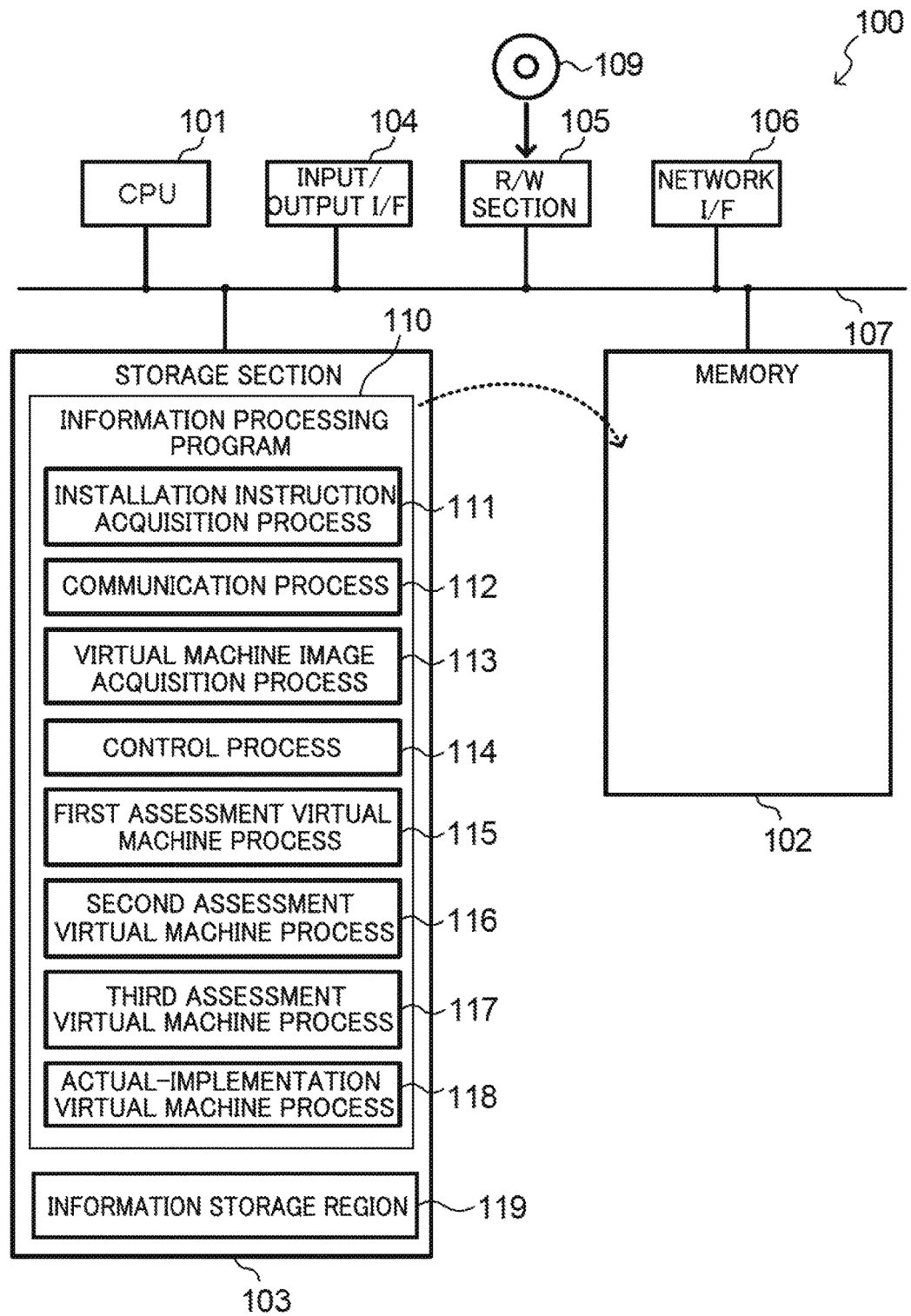
FIG. 20 is a block diagram illustrating a schematic configuration of a computer that functions as an information processing device.

The information processing device 4 may, for example, be implemented by the computer 100 illustrated in FIG. 20. The computer 100 includes a CPU 101, memory 102, a storage section 103, an input/output I/F 104, an R/W section 105 that controls reading and writing of data from and to a recording medium 109, and a network I/F 106. The CPU 101, the memory 102, the storage section 103, the input/output I/F 104, the R/W section 105, and the network I/F 106 are connected to one another through a bus 107.

The storage section 103 may by implemented by a HDD, an SSD, flash memory, or the like. An information processing program 110 for causing the computer 100 to function as the information processing device 4 is stored in the storage section 103, which serves as a storage medium. The storage section 103 also includes an information storage region 119 storing information to respectively configure the first assessment storage section 48, the second assessment storage section 49, the third assessment storage section 50, and the actual-implementation storage section 51. Programs for functioning as the OS and the virtual machines are also stored in the storage section 103.

The CPU 101 reads the information processing program 110 from the storage section 103, expands the information processing program 110 into the memory 102, and sequentially executes the processes included in the information processing program 110. The information processing program 110 includes an installation instruction acquisition process 111, a communication process 112, a virtual machine image acquisition process 113, and a control process 114. The information processing program 110 also includes a first assessment virtual machine process 115, a second assessment virtual machine process 116, a third assessment virtual machine process 117, and an actual-implementation virtual machine process 118. The CPU 101 operates as the installation instruction acquisition section 40 illustrated in FIG. 1 by executing the installation instruction acquisition process 111. The CPU 101 also operates as the communication section 42 illustrated in FIG. 1 by executing the communication process 112. The CPU 101 also operates as the virtual machine image acquisition section 45 illustrated in FIG. 12 by executing the virtual machine image acquisition process 113. The CPU 101 also operates as the controller 47 illustrated in FIG. 1 by executing the control process 114. The CPU 101 also operates as the first assessment virtual machine 53 illustrated in FIG. 1 by executing the first assessment virtual machine process 115. The CPU 101 also operates as the second assessment virtual machine 54 illustrated in FIG. 1 by executing the second assessment virtual machine process 116. The CPU 101 also operates as the third assessment virtual machine 55 illustrated in FIG. 1 by executing the third assessment virtual machine process 117. The CPU 101 also operates as the actual-implementation virtual machine 56 illustrated in FIG. 1 by executing the actual-implementation virtual machine process 118. The computer 100 executing the information processing program 110 thereby functions as the information processing device 4.

Note that the CPU 101 is configured by plural CPUs or a CPU that includes plural cores, and portions of the CPU 101 respectively allocated to the virtual machines execute each of the processes above.

Note that the functionality implemented by the information processing program 110 may, for example, be implemented by a semiconductor integrated circuit, and more specifically, by an ASIC or the like.

Next, explanation follows regarding operation of the information processing system 1 according to the present exemplary embodiment.

Figure 21:
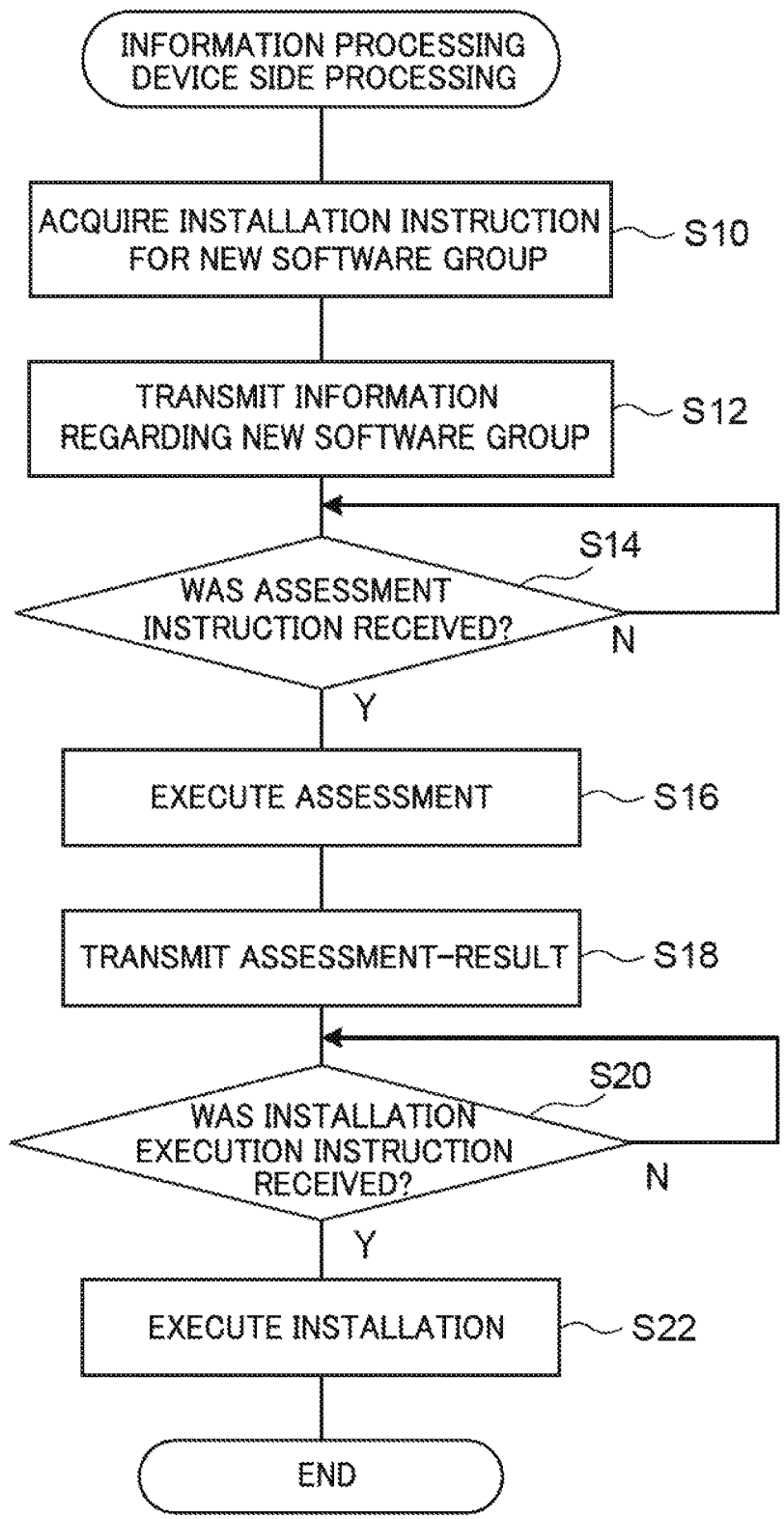
FIG. 21 is a flowchart illustrating an example of information processing device side processing.
Figure 22:
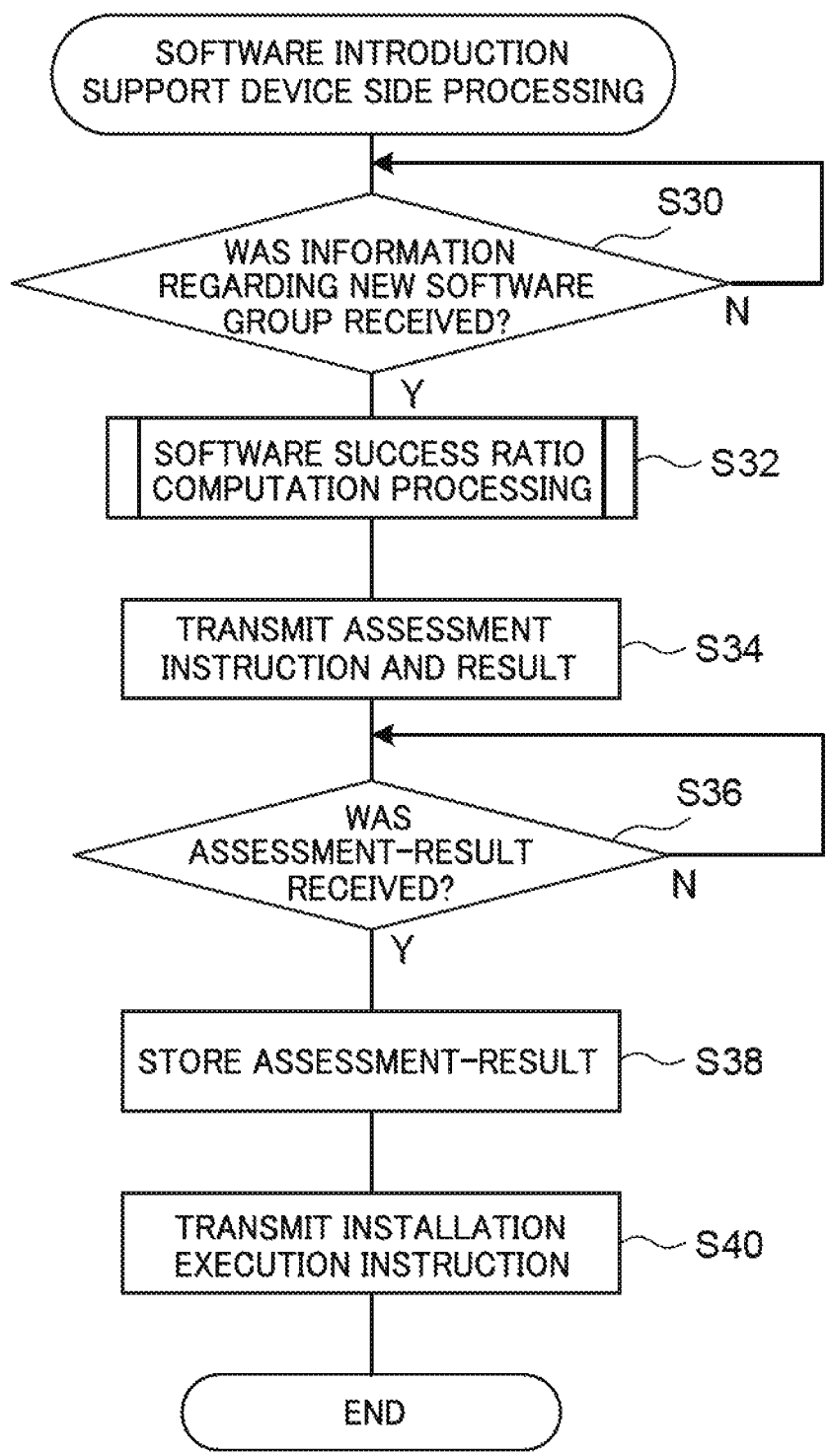
FIG. 22 is a flowchart illustrating an example of software introduction device side processing.

The information processing device 4 executes the information processing device side processing routine illustrated in FIG. 21, the software introduction support device 2 executes the software introduction support device side processing routine illustrated in FIG. 22.

The information processing device 4 executes the information processing device side processing routine illustrated in FIG. 21 when an installation instruction for a new software group is input by the user.

First, at step S10, the installation instruction acquisition section 40 acquires the installation instruction for the new software group input by the user.

Next, at step S12, the communication section 42 transmits, through the communication line 5 to the software introduction support device 2, the information for the new software group acquired at step S10.

The software introduction support device 2 executes the software introduction support device side processing routine illustrated in FIG. 22 when information regarding the new software group is transmitted from the information processing device 4.

At step S30, the communication section 23 determines whether or not the information regarding the new software group, which is the installation target, transmitted at step S12 has been received. Processing advances to step S32 in cases in which the information regarding the new software group has been received. However, step S30 is repeated in cases in which the information regarding the new software group has not been received.

At step S32, the controller 24 outputs, to the installation assessment section 25, the information regarding the new software group received at step S30. The installation assessment section 25 then executes the software success ratio computation processing routine illustrated in FIG. 23.

Figure 23:
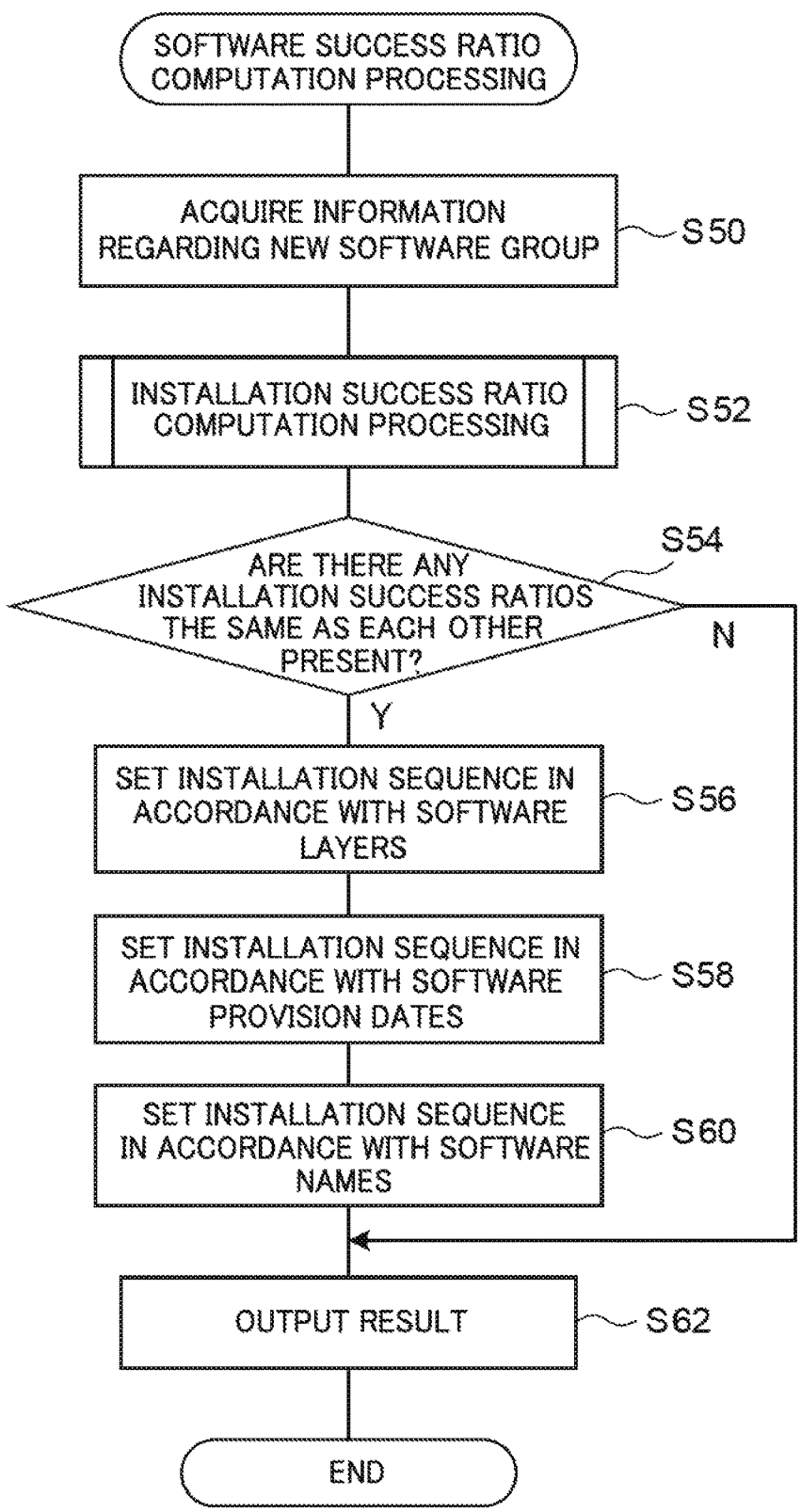
FIG. 23 is a flowchart illustrating an example of software success ratio computation processing.

At step S50 of the software success ratio computation processing routine illustrated in FIG. 23, the installation assessment section 25 acquires the information regarding the new software group output at step S32.

Figure 24:
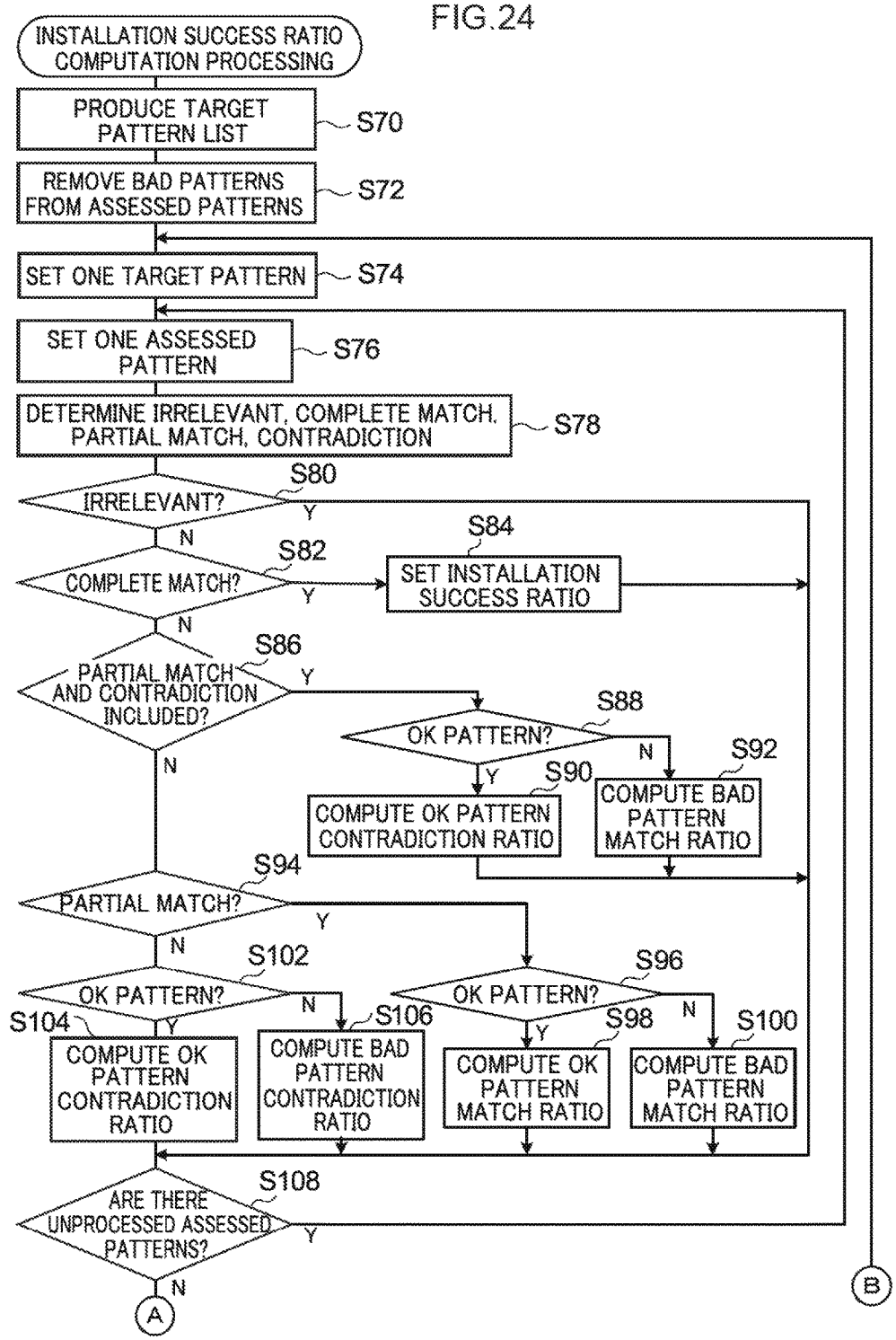
FIG. 24 is a flowchart illustrating an example of installation success ratio computation processing.
Figure 25:
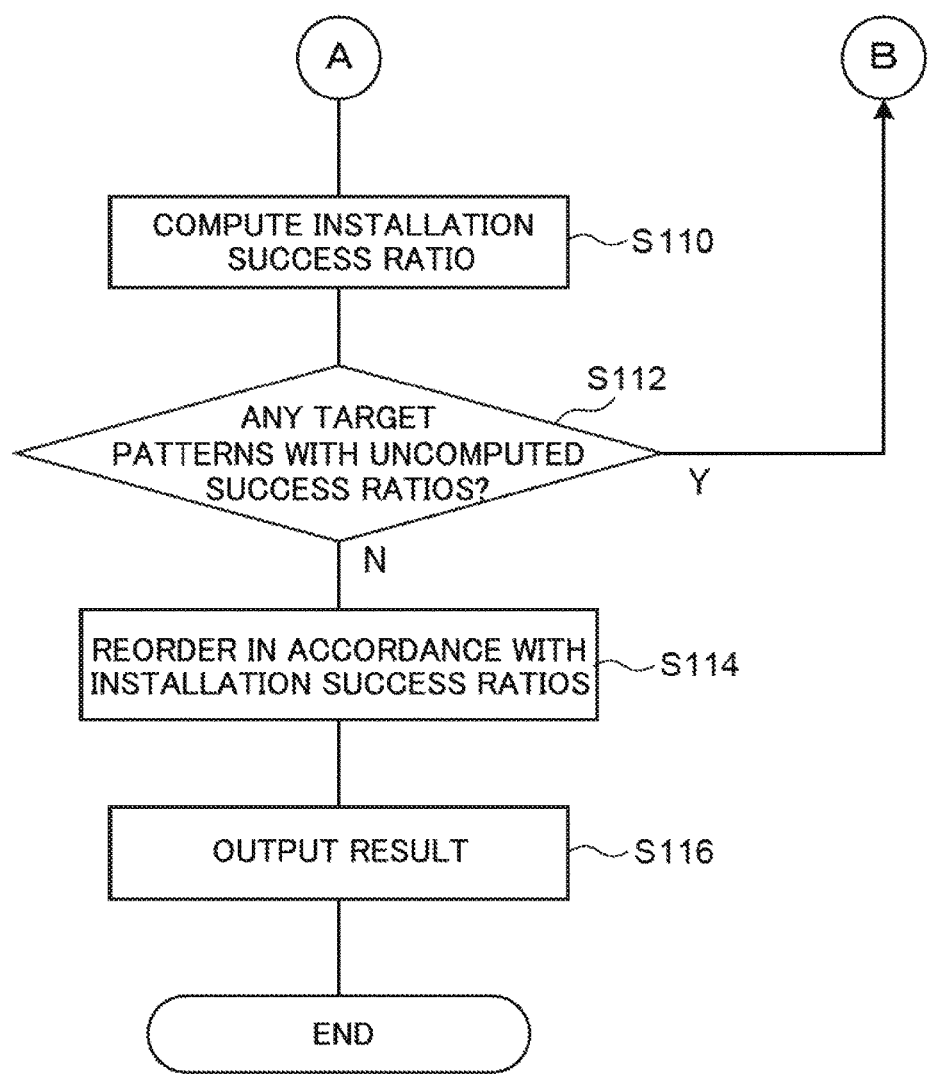
FIG. 25 is a flowchart illustrating an example of installation success ratio computation processing.

Next, at step S52, the installation assessment section 25 executes the installation success ratio computation processing routine illustrated in FIG. 24.

At step S70 of the installation success ratio computation processing routine illustrated in FIG. 24, the installation assessment section 25 produces a list including plural target patterns, from the information regarding the new software group acquired at step S50. The installation assessment section 25 also references the BAD software combination table 62 stored in the assessment result storage section 21. Then, any target patterns registered in the BAD software combination table 62 are removed from the produced list of target patterns, and the resulting list set as the target patterns.

At the next step S72, the installation assessment section 25 references the assessed pattern table 63 stored in the assessment result storage section 21. Then, any target patterns that completely match the BAD patterns registered in the assessed pattern table 63 are removed from the list of target patterns produced at step S70, and the resulting list set as the target patterns.

At step S74, the installation assessment section 25 sets one target pattern from out of the respective target patterns registered in the list of target patterns obtained at step S72.

At step S76, the installation assessment section 25 references the assessment result storage section 21, and sets one assessed pattern from out of the respective assessed patterns registered in the assessed pattern table 63.

At step S78, the installation assessment section 25 determines the correlation between the target pattern set at step S74 and the assessed pattern set at step S76.

More specifically, the installation assessment section 25 determines a complete match in cases in which the target pattern software pairs completely match the assessed pattern software pairs.

The installation assessment section 25 determines a partially match in cases in which there is a target pattern software pair included in the assessed pattern in the same sequence.

The installation assessment section 25 determines a contradiction in cases in which there is a target pattern software pair included in the assessed pattern in a different sequence.

The installation assessment section 25 determines irrelevant in cases in which the number software items that match between the target pattern and the assessed pattern is 0 or 1.

At step S80, the installation assessment section 25 determines whether or not the determination result between the target pattern and the assessed pattern is irrelevant based on the determination result at step S78. Processing proceeds to step S108 in cases in which the determination result between the target pattern and the assessed pattern is determination of irrelevant. However, processing proceeds to step S82 in cases in which the determination result between the target pattern and the assessed pattern is not determination of irrelevant.

At step S82, the installation assessment section 25 determines whether or not the determination result between the target pattern and the assessed pattern is a complete match based on the determination result at step S78. Processing proceeds to step S84 in cases in which the determination result between the target pattern and the assessed pattern is determination of a complete match. However, processing proceeds to step S86 in cases in which the determination result between the target pattern and assessed pattern is not determination of a complete match.

At step S84, the installation assessment section 25 sets the installation success ratio to 100% and processing proceeds to step S108.

At step S86, the installation assessment section 25 determines whether or not the determination result at step S78 includes both a partial match and a contradiction. Processing proceeds to step S88 in cases in which the determination result is that both a partial match and a contradiction are included. However, processing proceeds to step S94 in cases in which the determination result is that one out of a partial match or a contradiction is not included.

At step S88, the installation assessment section 25 determines whether or not the assessed pattern set at step S76 is an OK pattern. Processing proceeds to step S90 in cases in which the set assessed pattern is an OK pattern, the contradiction is employed from out of the partial match and the contradiction, and the OK pattern contradiction ratio is computed. However, in cases in which set assessed pattern is a BAD pattern, processing proceeds to step S92, the partial match is employed from out of the partial match and the contradiction, and the BAD pattern match ratio is computed.

At step S94, the installation assessment section 25 determines whether or not the determination result of step S78 is only a partial match. Processing proceeds to step S96 in cases in which the determination result is only a partial match. However, processing proceeds to step S102 in cases in which the determination result is only a contradiction.

At step S96, the installation assessment section 25 determines whether or not the assessed pattern set at step S76 is an OK pattern. Processing proceeds to step S98 in cases in which the set assessed pattern is an OK pattern, and the OK pattern match ratio is computed. However, processing proceeds to step S100 in cases in which the set assessed pattern is a BAD pattern, and the BAD pattern match ratio is computed.

At step S102, the installation assessment section 25 determines whether or not the assessed pattern set at step S76 is an OK pattern. Processing proceeds to step S104 in cases in which the set assessed pattern is an OK pattern, and the OK pattern contradiction ratio is computed. However, processing proceeds to step S106 in cases in which the set assessed pattern is a BAD pattern, and the BAD pattern contradiction ratio is computed. Processing proceeds to step S108 after the processing of step S90, S92, S98, S100, S104, or S106.

At step S108, the installation assessment section 25 determines whether or not the above processing of step S76 to step S106 has been executed for all of the assessed patterns registered in the assessed pattern table 63. Processing returns to step S76 in cases in which there is still an assessed pattern present therein for which the above processing of step S76 to step S106 has not been executed. However, processing proceeds to step S110 in cases in which the above processing of step S76 to step S106 has been executed for all of the assessed patterns of the assessed pattern table 63.

At step S110, the installation assessment section 25 computes the installation success ratio of the target pattern set at step S74 according to Equation (1), based on each of the values obtained at step S80 to step S108.

At step S112, the installation assessment section 25 determines whether or not the above processing of step S74 to step S110 has been executed for all of the target patterns registered in the list of target patterns obtained at step S72. Processing returns to step S74 in cases in which there is a target pattern present for which the above processing of step S74 to step S110 has not been executed. However, processing proceeds to step S114 in cases in which the above processing of step S74 to step S110 has been executed for all of the target patterns of the list of target patterns.

At step S114, the installation assessment section 25 reorders the target patterns in order from the highest installation success ratio based on the installation success ratio of each target patterns computed at step S110.

At step S116, the installation assessment section 25 outputs, as the result, combinations of the target patterns, which have been reordered in accordance with the installation success ratios obtained at step S114, and their installation success ratios, and then ends the installation success ratio computation processing routine.

Next, at step S54 of the software success ratio computation processing routine illustrated in FIG. 23, based on the result output at step S52, the installation assessment section 25 determines whether or not there are any installation success ratios present that are the same as each other. Processing proceeds to step S56 in cases in which there are installation success ratios the same as each other present. However, processing proceeds to step S66 in cases in there are no installation success ratios the same as each other present.

At step S56, the installation assessment section 25 references the software layer table 60 stored in the software information storage section 20. The installation assessment section 25 then reorders the target patterns that have the same installation success ratios as each other based on the priorities according to the layers to which the software included in the target patterns belong.

At step S58, the installation assessment section 25 references the software provision date table 61 stored in the software information storage section 20. The installation assessment section 25 then reorders the target patterns that have the same installation success ratios as each other in accordance with the provision dates of the software included in the target patterns.

At step S60, the installation assessment section 25 reorders the target patterns that have the same installation success ratios as each other in accordance with the names of the software included in the target patterns.

At step S62, the installation assessment section 25 outputs, as the result, a target pattern assessment instruction including the plural combinations of target patterns and installation success ratios that were obtained at each of the above steps.

Next, processing returns to the software installation support device side processing routine illustrated in FIG. 22, and at step S34, the controller 24 outputs, to the communication section 23, the target pattern assessment instruction output at step S62. The communication section 23 then transmits, through the communication line 5 to the information processing device 4, the target pattern assessment instruction output by the controller 24.

Next, processing returns to the information processing device side processing routine illustrated in FIG. 21, and the communication section 42 determines, at step S14, whether or not the target pattern assessment instruction transmitted at step S34 has been received. Processing proceeds to step S16 in cases in which the target pattern assessment instruction has been received. However, step S14 is repeated in cases in which the target pattern assessment instruction has not been received.

At step S16, the virtual machine image acquisition section 45 acquires the target pattern assessment instruction received at step S14, and replicates and acquires the virtual machine image stored in the predetermined storage region of the information processing device 4. The virtual machine image acquisition section 45 then stores the acquired virtual machine image in the first assessment storage section 48, the second assessment storage section 49, and the third assessment storage section 50.

The controller 47 also acquires the target pattern assessment instruction received at step S14. The controller 47 then, in accordance with the installation success ratios included in the target pattern assessment instruction, instructs the first assessment virtual machine 53, the second assessment virtual machine 54, and the third assessment virtual machine 55 to assess the target pattern that accords with the installation sequence.

Next, the specific software and the specific test tools are downloaded, by each assessment virtual machine, from the software library table 64 and the test tool library table 65 stored in the library storage section 22 of the software introduction support device 2.

The first assessment virtual machine 53 then loads the virtual machine image stored in first assessment storage section 48, and, in response to the assessment instruction output by the controller 47, performs an installation assessment of the software in accordance with the installation sequence of the target pattern.

The second assessment virtual machine 54 loads the virtual machine image stored in the second assessment storage section 49, and, in response to the assessment instruction output by the controller 47 performs an installation assessment of the software in accordance with the installation sequence of the target pattern.

The third assessment virtual machine 55 loads the virtual machine image stored in the third assessment storage section 50, and, in response to the assessment instruction output by the controller 47, performs an installation assessment of the software in accordance with the installation sequence of the target pattern.

The first assessment virtual machine 53, the second assessment virtual machine 54, and the third assessment virtual machine 55 then output the installation-assessment results to the controller 47.

At step S18, the controller 47 outputs, to the communication section 42, the installation-assessment results obtained at step S16. The communication section 42 transmits, through the communication line 5 to the software introduction support device 2, the installation-assessment results output by the controller 47.

Next, processing returns to the software introduction support device side processing routine illustrated in FIG. 22, and, at step S36, the communication section 23 determines whether or not the installation-assessment results transmitted at step S18 have been received. Processing proceeds to step S38 in cases in which the installation-assessment results have been received. However, step S36 is repeated in cases in which the installation-assessment results have not been received.

At step S38, the controller 24 stores the installation-assessment results received at step S36 in the assessment result storage section 21.

At step S40, the controller 24 outputs an installation execution instruction for at least one out of the target patterns for which installation succeeded, based on the installation-assessment results received at step S36. The communication section 23 then transmits, through the communication line 5 to the information processing device 4, the installation execution instruction output by the controller 24, and ends the software introduction support device side processing routine.

Next, processing returns to the information processing device side processing routine illustrated in FIG. 21, and, at step S20, the communication section 42 determines whether or not the installation execution instruction transmitted at step S40 has been received. Processing proceeds to step S22 in cases in which the installation execution instruction has been received. However, step S20 is repeated in cases in which the installation execution instruction has not been received.

At step S22, when the installation execution instruction received at step S20 is acquired, the virtual machine image acquisition section 45 replicates and acquires the virtual machine image stored in a predetermined storage region of the information processing device 4. The virtual machine image acquisition section 45 then stores the acquired virtual machine image in the actual-implementation storage section 51.

The controller 47 acquires the installation execution instruction received at step S20. The controller 47 then instructs the actual-implementation virtual machine 56 to execute installation of the target pattern according to the target pattern included in the installation execution instruction.

Next, the specific software are downloaded by the actual-implementation virtual machine 56 from the software library table 64 and the test tool library table 65 stored in the library storage section 22 of the software introduction support device 2.

The actual-implementation virtual machine 56 then loads the virtual machine image stored in the actual-implementation storage section 51, and, in response to the instruction to execute installation of the target pattern output by the controller 47, executes installation of the software in accordance with the installation sequence of the target pattern. The information processing device side processing routine then ends.

As explained above, according to the information processing system 1 according to the present exemplary embodiment, the assessment result storage section 21 is referenced and the correlations determined between the target pattern and the assessed patterns stored in the assessment result storage section 21. Based on the result of the determination, a determination that there is a partial match of the target pattern to an assessed pattern is reflected in the installation success ratio as the OK pattern match ratio to an OK pattern, or as the BAD pattern match ratio to a BAD pattern. Determination that there is a contradiction of the target pattern to an assessed pattern is reflected in the installation success ratio as the OK pattern contradiction ratio to an OK pattern, or as the BAD pattern contradiction ratio to a BAD pattern.

In this manner, the software introduction support device can estimate whether or not the new software group is introducible in consideration of the software correlation between the target pattern and the assessed patterns.

Moreover, the assessment time can be shorted since the installation assessment task proceeds in sequence from the highest installation success ratio. Note that the more software that is the target, the greater the decrease in the time.

Combination conditions, installation sequences, and the like of the software are clearly established from the accumulated data without being dependent on the experience individual users.

Moreover, all tasks needed for usage to start are performed automatically, it is sufficient to determine whether or not to proceed with installation based on the successful assessment-results.

Moreover, assessment data is accumulated from actual results, enabling production of a more precise success ratio.

For example, explanation follows regarding a case of installation of five software products in which installation succeeded on the third installation due to computation of the installation success ratio of a target pattern having a modified installation sequence.

Here, in cases in which five software products are installed, the number of target patterns that accord with the installation sequence is "5!=120". If the time taken to install one software product is 0.5 hours, then for five software products the time is 0.5 hours×5 products=2.5 hours. For example, in cases in which the third pattern succeeded from the top out of the (120) target patterns, the time taken is 2.5 hours×3=7.5 hours.

However, in the worst case scenario by a conventional method, in which the installation success ratio is not computed and the $120^{th}$ installation is successful, the time taken is 2.5 hours×120=300 hours (12.5 days).

In cases in which plural software items are to be installed, the installation success ratio is computed, based on past actual results by software introduction support devices, for each target pattern corresponding to software installation sequences. The installation time is then reduced and costs are curtailed by assessing installation in sequence from the target patterns having the highest installation success ratio. Moreover, not only complete matches, but also partial matches and contradictions are considered in the installation success ratio computation.

Note that although a case has been explained in the present exemplary embodiment in which technology disclosed herein is applied to an information processing system provided with a software introduction support device that computes the installation success ratio and to an information processing device provided with virtual machines, there is no limitation thereto. Technology disclosed herein is applicable to systems that, based on information regarding plural software items of an installation target, compute an installation success ratio of a set target pattern from the plural software items. For example, an instruction to compute an installation success ratio may be output to a software introduction support device from a device other than an information processing device, and an information processing device may execute installation of plural software items according to installation success ratios computed by the software introduction support device.

Moreover, for example, the installation success ratio computed by the software introduction support device may be configured as a system in which a charge is made for use of the information processing device.

Moreover, in the present exemplary embodiment, explanation has been given regarding a case in which the installation success ratio is computed according to Equation (1). However, there is no limitation thereto, and, as long as values are obtained according to the installation sequence, any calculation may be employed therefor. For example, the Equations (12) to (17) below may be employed as the installation success ratio.

$$\alpha_1 \tag{12}$$

$$\alpha \tag{13}$$

$$\alpha_1 \cdot \{\Pi_{i=1}^{n}(1-\beta_i)\}=1 \tag{14}$$

$$\alpha_1 \cdot (1-\gamma_1) \tag{15}$$

$$\alpha_1 \cdot \Pi_{j=1}^{m}\delta_j \tag{16}$$

Note that although explanation has been given in the exemplary embodiment above in which each program is in a format pre-stored (installed) in a storage section, there is no limitation thereto. Programs according to technology disclosed herein may be provided in a format recorded to a recording medium such as a CD-ROM, a DVD-ROM, or USB memory.

In the case of the related technology, there may be no combination of the respective software items included in the software group of the installation target that completely matches the installation sequence of assessed to be capable of operating. In such cases assessment of installation is, for example, performed for every installation sequence by trial and error or the like, lengthening the time taken for assessment, and the installation time is not shortened.

Technology disclosed herein enables the installation time for plural items of introduction-target software to be shortened.

All publications, patent applications and technical standards mentioned in the present specification are incorporated by reference in the present specification to the same extent as if the individual publication, patent application, or technical standard was specifically and individually indicated to be incorporated by reference.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a program, which when executed by a computer, causes the computer to perform a software introduction support process, the process comprising:

referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, computing a successful partial-match-pair type coverage ratio representing a ratio between the number of pairs included in a pair group that includes the software pairs sequenced following the introduction sequence information corresponding to the new introduction software group, and the number of software pairs that are included in a pair group corresponding to the new introduction software group and that match software pairs in the introduction sequence information corresponding to the plurality of items of introduction actual-result information associated with successful introduction, and computing a successful match ratio representing partial matches to the introduction actual-result information of successful introduction according to the successful maximum partial-match-pair content ratio, and according to the difference between the successful maximum partial-match-pair content ratio and the successful partial-match-pair type coverage ratio, and the successful match ratio is reflected in the estimation result as the positive element for the success.

2. A non-transitory recording medium storing a program, which when executed by a computer, causes the computer to perform a software introduction support process, the process comprising:

referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with the successful introduction:

reflecting the successful maximum partial-match-pair content ratio in the estimation result as the element for the success, and for each of the plurality of items of introduction actual-result information associated with successful introduction, computing a success contradiction ratio representing a ratio between the number of pairs contained in a pair group having a greatest number of pairs from out of the pair group of software pairs sequenced following the introduction sequence information corresponding to the introduction actual-result information of successful introduction and a pair group including software pairs sequenced following the introduction sequence information corresponding to the new introduction software group, and a number of differently sequenced combinations of software pairs included in a lesser number pair group that match the software pairs included in the greater number pair group, and reflecting the success contradiction ratio in the estimation result as the positive element for the failure.

3. A non-transitory recording medium storing a program, which when executed by a computer, causes the computer to perform a software introduction support process, the process comprising:

referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that the introduction sequence information regarding respective software items included in the new introduction software group partially matches the introduction actual-result information associated with a failed introduction:

reflecting the successful maximum partial-match-pair content ratio in the estimation result as the element for the success, and for each of the plurality of items of introduction actual-result information associated with the failed introduction, computing ratios between a number of software pairs that are sequenced following the introduction sequence information corresponding to the new introduction software group and that match the software pairs sequenced following the introduction sequence information corresponding to the introduction actual-result information of the failed introduction, and a number of pairs included in the pair group that includes software pairs sequenced following the software introduction sequence information corresponding to the introduction actual-result information of the failed introduction, and reflecting a failure maximum partial-match-pair content ratio representing the maximum value out of the computed ratios in the estimation result as the positive element for the failure.

4. A non-transitory recording medium storing a program, which when executed by a computer, causes the computer to perform a software introduction support process, the process comprising:

referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with a failed introduction:
reflecting the successful maximum partial-match-pair content ratio in the estimation result as the element for the success, and
for each of the plurality of items of introduction actual-result information associated with failed introduction,
computing a failure contradiction ratio representing a ratio between the number of pairs contained in a pair group having a greatest number of pairs from out of a pair group of software pairs sequenced following the introduction sequence information corresponding to the introduction actual-result information of the failed introduction and a pair group including software pairs sequenced following the introduction sequence information corresponding to the new introduction software group, and a number of differently sequenced combinations of software pairs included in a lesser number pair group that match the software pairs included in the greater number pair group, and reflecting the failed contradiction ratio in the estimation result as the element for the success.

5. The non-transitory recording medium of claim 4, wherein the process further comprises:
in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with the successful introduction, and that an introduction sequence information regarding respective software items included in the new introduction software group partially matches the introduction actual-result information associated with the failed introduction, and that the differently sequenced combination of the new introduction software group matches the introduction actual-result information associated with the failed introduction, reflecting the successful match ratio in the estimation result as the element for the success, and:
for each of the plurality of items of introduction actual-result information associated with the successful introduction:
computing a success contradiction ratio representing a ratio between the number of pairs contained in a pair group having a greatest number of pairs from out of a pair group including software pairs sequenced following the introduction sequence information corresponding to the introduction actual-result information of successful introduction and a pair group including software pairs sequenced following the introduction sequence information corresponding to the new introduction software group, and a number of differently sequenced combinations of software pairs included in a lesser number pair group that match the software pairs included in the greater number pair group, and
reflecting the success contradiction ratio in the estimation result as the element for the failure; and
for each of the plurality of items of introduction actual-result information associated with the failed introduction:
computing ratios between a number of software pairs that are included in a pair group corresponding to the new introduction software group and that match the software pairs included in the pair group corresponding to the introduction actual-result information of the introduction failure, and a number of pairs included in the pair group corresponding to the introduction actual-result information of introduction failure, and computing a failure maximum partial-match-pair content ratio representing the maximum value out of the computed ratios,
computing a failure partial-match-pair type coverage ratio representing a ratio between a number of pairs included in the pair group corresponding to the new introduction software group, and the number of software pairs that are included in the pair group corresponding to the new introduction software group and that match the software pairs included in the pair group corresponding to the plurality of introduction actual-result information associated with the introduction failure,
computing a failure match ratio representing partial matching with the introduction actual-result information of the introduction failure, according to the difference between the failure maximum partial-match-pair content ratio and the failure partial-match-pair type coverage ratio, and
reflecting the failure match ratio in the estimation result as the element for the failure; and
for each of the plurality of items of introduction actual-result information associated with introduction failure:
computing a failure contradiction ratio representing a ratio between the number of pairs contained in a pair group having the greatest number of pairs from out of a pair group corresponding to the introduction actual-result information of the failed introduction and the pair group corresponding to the new introduction software group, and a number of the differently sequenced combinations of the software pairs included in the lesser number pair group that match the software pairs included in the greater number pair group, and
reflecting the failure contradiction ratio in the estimation result as the element for the success.

6. A software introduction support device comprising:
a memory; and
a processor coupled to the memory and the processor configured to:
reference a storage section storing one or more items of introduction actual-result information associating introduction sequence information regarding respective software items included in a software group with success or failure of introduction, and determine any correlations between introduction sequence information regarding respective software items included in a new introduction software group and the introduction sequence information stored in the storage section;
in a case in which estimating whether or not introduction of the new introduction software group succeeds based on the result of the determination, reflect in an estimation result any determination that the introduction sequence information regarding respective software items included in the new introduction software group partially matches the introduction sequence information stored in the storage section, as a positive element for the success or failure of the introduction of the new introduction software group, and reflect in the estimation result any determination that a differently sequenced combination of the introduction software group matches the introduction sequence information stored in the storage section, as a negative element for the success or failure of the introduction of the new introduction software group;
assess for software installation of the new introduction software group based on the estimation result; and
install the new introduction software group based on the assessing, wherein
in a case in which estimating whether or not introduction of the new introduction software group succeeds, and in a case in which determination has been made that the introduction sequence of the introduction software group partially matches the introduction actual-result information associated with successful introduction, for each of a plurality of items of the introduction actual-result information associated with successful introduction, ratios are computed between the number of software pairs that are sequenced following the introduction sequence information corresponding to the new introduction software group and that match software pairs sequenced following the introduction sequence information corresponding to the introduction actual-result information of successful introduction, and the number of pairs included in a pair group of the software pairs sequenced following the introduction sequence information corresponding to the introduction actual-result information of the successful introduction, and a successful maximum partial-match-pair content ratio that is a maximum value out of the computed ratios is reflected in the estimation result as the positive element for the success, wherein
in a case in which estimating whether or not introduction of the new introduction software group succeeds, and in a case in which determination has been made that the introduction sequence of the introduction software group partially matches the introduction actual-result information associated with successful introduction:
a successful partial-match-pair type coverage ratio is computed representing a ratio between the number of pairs included in a pair group that includes the software pairs sequenced following the introduction sequence information corresponding to the new introduction software group, and the number of software pairs that are included in a pair group corresponding to the new introduction software group and that match software pairs in the introduction sequence information corresponding to the plurality of items of introduction actual-result information associated with successful introduction; and
a successful match ratio is computed representing partial matches to the introduction actual-result information of successful introduction according to the successful maximum partial-match-pair content ratio, and according to the difference between the successful maximum partial-match-pair content ratio and the successful partial-match-pair type coverage ratio, and the successful match ratio is reflected in the estimation result as the positive element for the success.

7. A software introduction support device comprising:
a memory; and
a processor coupled to the memory and the processor configured to:
reference a storage section storing one or more items of introduction actual-result information associating introduction sequence information regarding respective software items included in a software group with success or failure of introduction, and determine any correlations between introduction sequence information regarding respective software items included in a new introduction software group and the introduction sequence information stored in the storage section;
in a case in which estimating whether or not introduction of the new introduction software group succeeds based on the result of the determination, reflect in an estimation result any determination that the introduction sequence information regarding respective software items included in the new introduction software group partially matches the introduction sequence information stored in the storage section, as a positive element for the success or failure of the introduction of the new introduction software group, and reflect in the estimation result any determination that a differently sequenced combination of the introduction software group matches the introduction sequence information stored in the storage section, as a negative element for the success or failure of the introduction of the new introduction software group;
assess for software installation of the new introduction software group based on the estimation result; and
install the new introduction software group based on the assessing, wherein
in a case in which estimating whether or not introduction of the new introduction software group succeeds, and in a case in which determination has been made that the introduction sequence of the introduction software group partially matches the introduction actual-result information associated with successful introduction, for each of a plurality of items of the introduction actual-result information associated with successful introduction, ratios are computed between the number of software pairs that are sequenced following the introduction sequence information corresponding to the new introduction software group and that match software pairs sequenced following the introduction sequence information corresponding to the introduction actual-result information of successful introduction, and the number of pairs included in the pair group of the software pairs sequenced following the introduction sequence information corresponding to the introduction actual-result information of the successful introduction, and a successful maximum partial-match-pair content ratio that is a maximum value out of the computed ratios is reflected in the estimation result as the positive element for the success, wherein
in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with successful introduction:

the successful maximum partial-match-pair content ratio is reflected in the estimation result as the element for the success, and for each of the plurality of items of introduction actual-result information associated with successful introduction, a success contradiction ratio is computed representing a ratio between the number of pairs contained in a pair group having a greatest number of pairs from out of the pair group of software pairs sequenced following the introduction sequence information corresponding to the introduction actual-result information of successful introduction and a pair group including software pairs sequenced following the introduction sequence information corresponding to the new introduction software group, and a number of differently sequenced combinations of software pairs included in a lesser number pair group that match the software pairs included in the greater number pair group, and the success contradiction ratio is reflected in the estimation result as the positive element for the failure.

8. A software introduction support method comprising:

by a processor, referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, computing a successful partial-match-pair type coverage ratio representing a ratio between the number of pairs included in a pair group that includes the software pairs sequenced following the introduction sequence information corresponding to the new introduction software group, and the number of software pairs that are included in a pair group corresponding to the new introduction software group and that match software pairs in the introduction sequence information corresponding to the plurality of items of introduction actual-result information associated with successful introduction, and computing a successful match ratio representing partial matches to the introduction actual-result information of successful introduction according to the successful maximum partial-match-pair content ratio, and according to the difference between the successful maximum partial-match-pair content ratio and the successful partial-match-pair type coverage ratio, and the successful match ratio is reflected in the estimation result as the positive element for the success.

9. A software introduction support device comprising:

a memory; and a processor coupled to the memory and the processor configured to:

reference a storage section storing one or more items of introduction actual-result information associating introduction sequence information regarding respective software items included in a software group with success or failure of introduction, and determine any correlations between introduction sequence information regarding respective software items included in a new introduction software group and the introduction sequence information stored in the storage section;

in a case in which estimating whether or not introduction of the new introduction software group succeeds based on the result of the determination, reflect in an estimation result any determination that the introduction sequence information regarding respective software items included in the new introduction software group partially matches the introduction sequence information stored in the storage section, as a positive element for the success or failure of the introduction of the new introduction software group, and reflect in the estimation result any determination that a differently sequenced combination of the introduction software group matches the introduction sequence information stored in the storage section, as a negative element for the success or failure of the introduction of the new introduction software group;

assess for software installation of the new introduction software group based on the estimation result; and install the new introduction software group based on the assessing, wherein in a case in which estimating whether or not introduction of the new introduction software group succeeds, and in a case in which determination has been made that the introduction sequence of the introduction software group partially matches the introduction actual-result information associated with successful introduction, for each of a plurality of items of the introduction actual-result information associated with successful introduction, ratios are computed between a number of software pairs that are sequenced following the introduction sequence information corresponding to the new introduction software group and that match software pairs sequenced following the introduction sequence information corresponding to the introduction actual-result information of successful introduction, and a number of pairs included in a pair group of the software pairs sequenced following the introduction sequence information corresponding to the introduction actual-result information of the successful introduction, and a successful maximum partial-match-pair content ratio that is a maximum value out of the computed ratios is reflected in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that the introduction sequence information regarding respective software items included in the new introduction software group partially matches the introduction actual-result information associated with a failed introduction, the successful maximum partial-match-pair content ratio in the estimation result if reflected as the element for the success, and for each of the plurality of items of introduction actual-result information associated with the failed introduction, ratios are computed between a number of software pairs that are sequenced following the introduction sequence information corresponding to the new introduction software group and that match the software pairs sequenced following the introduction sequence information corresponding to the introduction actual-result information of the failed introduction, and a number of pairs included in the pair group that includes software pairs sequenced following the software introduction sequence information corresponding to the introduction actual-result information of the failed introduction, and reflecting a failure maximum partial-match-pair content ratio representing the maximum value out of the computed ratios in the estimation result as the positive element for the failure.

10. A software introduction support device comprising:
a memory; and
a processor coupled to the memory and the processor configured to:
reference a storage section storing one or more items of introduction actual-result information associating introduction sequence information regarding respective software items included in a software group with success or failure of introduction, and determine any correlations between introduction sequence information regarding respective software items included in a new introduction software group and the introduction sequence information stored in the storage section;

in a case in which estimating whether or not introduction of the new introduction software group succeeds based on the result of the determination, reflect in an estimation result any determination that the introduction sequence information regarding respective software items included in the new introduction software group partially matches the introduction sequence information stored in the storage section, as a positive element for the success or failure of the introduction of the new introduction software group, and reflect in the estimation result any determination that a differently sequenced combination of the introduction software group matches the introduction sequence information stored in the storage section, as a negative element for the success or failure of the introduction of the new introduction software group;

assess for software installation of the new introduction software group based on the estimation result; and install the new introduction software group based on the assessing, wherein in a case in which estimating whether or not introduction of the new introduction software group succeeds, and in a case in which determination has been made that the introduction sequence of the introduction software group partially matches the introduction actual-result information associated with successful introduction, for each of a plurality of items of the introduction actual-result information associated with successful introduction, ratios are computed between a number of software pairs that are sequenced following the introduction sequence information corresponding to the new introduction software group and that match software pairs sequenced following the introduction sequence information corresponding to the introduction actual-result information of successful introduction, and a number of pairs included in a pair group of the software pairs sequenced following the introduction sequence information corresponding to the introduction actual-result information of the successful introduction, and a successful maximum partial-match-pair content ratio that is a maximum value out of the computed ratios is reflected in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with a failed introduction, the successful maximum partial-match-pair content ratio is reflected in the estimation result as the element for the success, and for each of the plurality of items of introduction actual-result information associated with the failed introduction, a failure contradiction ratio is computed representing a ratio between the number of pairs contained in a pair group having a greatest number of pairs from out of a pair group of software pairs sequenced following the introduction sequence information corresponding to the introduction actual-result information of the failed introduction and a pair group including software pairs sequenced following the introduction sequence information corresponding to the new introduction software group, and a number of differently sequenced combinations of software pairs included in a lesser number pair group that match the software pairs included in the greater number pair group, and reflecting the failed contradiction ratio in the estimation result as the element for the success.

11. A software introduction support method comprising:
by a processor,
referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;
in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;
assessing for software installation of the new introduction software group based on the estimation result; and
installing the new introduction software group based on the assessing, wherein
in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:
computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction,
reflecting a successful maximum partial-match-pair content ratio that is a maximum value out of computed ratios in the estimation result as the positive element for the success, wherein
in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with the successful introduction:
reflecting the successful maximum partial-match-pair content ratio in the estimation result as the element for the success, and
for each of the plurality of items of introduction actual-result information associated with successful introduction,
computing a success contradiction ratio representing a ratio between the number of pairs contained in a pair group having a greatest number of pairs from out of the pair group of software pairs sequenced following the introduction sequence information corresponding to the introduction actual-result information of successful introduction and a pair group including software pairs sequenced following the introduction sequence information corresponding to the new introduction software group, and a number of differently sequenced combinations of software pairs included in a lesser number pair group that match the software pairs included in the greater number pair group, and
reflecting the success contradiction ratio in the estimation result as the positive element for the failure.

12. A software introduction support method comprising:
by a processor,
referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;
in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;
assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that the introduction sequence information regarding respective software items included in the new introduction software group partially matches the introduction actual-result information associated with a failed introduction:

reflecting the successful maximum partial-match-pair content ratio in the estimation result as the element for the success, and for each of the plurality of items of introduction actual-result information associated with the failed introduction, computing ratios between a number of software pairs that are sequenced following the introduction sequence information corresponding to the new introduction software group and that match the software pairs sequenced following the introduction sequence information corresponding to the introduction actual-result information of the failed introduction, and a number of pairs included in the pair group that includes software pairs sequenced following the software introduction sequence information corresponding to the introduction actual-result information of the failed introduction, and reflecting a failure maximum partial-match-pair content ratio representing the maximum value out of the computed ratios in the estimation result as the positive element for the failure.

13. A software introduction support method comprising:
by a processor,
referencing a storage section storing one or more items of introduction actual-result information associating introduction sequence information regarding respective software items included in a software group with success or failure of introduction, and determining any correlations between introduction sequence information regarding respective software items included in a new introduction software group and the introduction sequence information stored in the storage section;

in a case in which estimating whether or not introduction of the new introduction software group succeeds based on the result of the determination, reflecting in an estimation result any determination that the introduction sequence information regarding respective software items included in the new introduction software group partially matches the introduction sequence information stored in the storage section, as a positive element for the success or failure of the introduction of the new introduction software group, and reflecting in the estimation result any determination that a differently sequenced combination of the new introduction software group matches the introduction sequence information stored in the storage section, as a negative element for the success or failure of the introduction of the new introduction software group;

assessing for software installation of the new introduction software group based on the estimation result; and installing the new introduction software group based on the assessing, wherein in a case in which estimating whether or not introduction of the new introduction software group succeeds, and in a case in which determination has been made that the introduction sequence information regarding respective software items included in the new introduction software group partially matches the introduction actual-result information associated with successful introduction, for each of a plurality of items of the introduction actual-result information associated with the successful introduction:

computing a ratio between a number of software pairs that are sequenced following the introduction sequence information corresponding to the new introduction software group and that match software pairs sequenced following the introduction sequence information corresponding to the introduction actual-result information of successful introduction and a number of pairs included in a pair group of the software pairs sequenced following the introduction sequence information corresponding to the introduction actual-result information of the successful introduction, reflecting a successful maximum partial-match-pair content ratio that is a maximum value out of computed ratios in the estimation result as the positive element for the success, wherein in a case in which estimating whether or not introduction of the new introduction software group succeeds, and in a case in which determination has been made that the introduction sequence information regarding respective software items included in the new introduction software group partially matches the introduction actual-result information associated with the successful introduction, and that a differently sequenced combination of respective software items included in the new introduction software group matches the introduction actual-result information associated with a failed introduction:

reflecting the successful maximum partial-match-pair content ratio in the estimation result as the element for the success, and for each of the plurality of items of introduction actual-result information associated with failed introduction, computing a failure contradiction ratio representing a ratio between the number of pairs contained in a pair group having a greatest number of pairs from out of a pair group of software pairs sequenced following the introduction sequence information corresponding to the introduction actual-result information of the failed introduction and a pair group including software pairs sequenced following the introduction sequence information corresponding to the new introduction software group, and a number of differently sequenced combinations of software pairs included in a lesser number pair group that match the software pairs included in the greater number pair group, and reflecting the failed contradiction ratio in the estimation result as the element for the success.

* * * * *